(12) United States Patent
Harlow

(10) Patent No.: US 9,663,659 B1
(45) Date of Patent: May 30, 2017

(54) MANAGING COMPUTER NETWORK RESOURCES

(71) Applicant: James D. Harlow, Los Gatos, CA (US)

(72) Inventor: James D. Harlow, Los Gatos, CA (US)

(73) Assignee: Netfuel Inc., Los Gatos, CA (US)

( * ) Notice: Subject to any disclaimer, the term of this patent is extended or adjusted under 35 U.S.C. 154(b) by 181 days.

(21) Appl. No.: 13/648,623

(22) Filed: Oct. 10, 2012

Related U.S. Application Data

(63) Continuation of application No. 13/363,203, filed on Jan. 31, 2012.

(51) Int. Cl.
G06F 15/16 (2006.01)
C09B 43/06 (2006.01)

(52) U.S. Cl.
CPC .................................. C09B 43/06 (2013.01)

(58) Field of Classification Search
CPC . H04L 12/2697; H04L 41/045; H04L 41/147; H04L 43/50
USPC ......................................................... 709/201
See application file for complete search history.

(56) References Cited

U.S. PATENT DOCUMENTS

| | | | |
|---|---|---|---|
| 4,825,206 A | 4/1989 | Brice, Jr. et al. | |
| 5,404,565 A | 4/1995 | Gould et al. | |
| 5,493,689 A | 2/1996 | Waclawsky et al. | |
| 5,556,698 A | 9/1996 | Amirsakis et al. | |
| 5,655,081 A | 8/1997 | Bonnell et al. | |
| 5,761,507 A | 6/1998 | Govett | |
| 6,023,722 A | 2/2000 | Colyer | |
| 6,038,601 A | 3/2000 | Lambert et al. | |
| 6,408,163 B1 | 6/2002 | Fik | |
| 6,557,035 B1 | 4/2003 | McKnight | |
| 6,629,138 B1 | 9/2003 | Lambert et al. | |
| 6,643,699 B1 * | 11/2003 | Liver | 709/226 |
| 6,732,139 B1 | 5/2004 | Dillenberger et al. | |
| 6,779,184 B1 | 8/2004 | Puri et al. | |
| 6,785,736 B1 | 8/2004 | Barillaud | |
| 6,807,580 B2 | 10/2004 | Freeman et al. | |
| 6,813,634 B1 | 11/2004 | Ahmed | |
| 6,839,850 B1 | 1/2005 | Campbell et al. | |
| 6,868,544 B2 | 3/2005 | Dalal et al. | |
| 6,874,020 B1 | 3/2005 | Da Palma et al. | |
| 6,895,586 B1 | 5/2005 | Brasher et al. | |
| 6,970,981 B2 | 11/2005 | Kanaley | |
| 6,990,534 B2 | 1/2006 | Mikhailov et al. | |
| 6,996,076 B1 | 2/2006 | Forbes et al. | |
| 7,016,978 B2 | 3/2006 | Malik et al. | |
| 7,035,924 B2 | 4/2006 | DeLuca et al. | |

(Continued)

OTHER PUBLICATIONS

Bharat, Krishna A, et al, Migratory Applications, Digital Equipment Corporation, SRC Research Report (Feb. 15, 1996).

(Continued)

*Primary Examiner* — Douglas Blair
(74) *Attorney, Agent, or Firm* — HM Law Group LLP; Vani Moodley, Esq.

(57) ABSTRACT

Software agents are assigned goals in accordance with network policies that define a desired operational characteristic of a network. A software agent achieves its assigned goal by executing a predefined task. An assigned goal may be dynamically modified as necessary based on the actual operational characteristics of the network. The software agent may request further policy if it cannot achieve its assigned goal by performing the predefined task.

18 Claims, 22 Drawing Sheets

(56) References Cited

U.S. PATENT DOCUMENTS

| | | | |
|---|---|---|---|
| 7,039,050 B1 | 5/2006 | Mutreja | |
| 7,051,071 B2 | 5/2006 | Stewart et al. | |
| 7,051,334 B1 | 5/2006 | Porter et al. | |
| 7,080,385 B1 | 7/2006 | Collison et al. | |
| 7,107,543 B2 | 9/2006 | Berry et al. | |
| 7,174,363 B1 | 2/2007 | Goldstein et al. | |
| 7,181,489 B2 | 2/2007 | Lection et al. | |
| 7,194,533 B1 | 3/2007 | De Luca | |
| 7,194,543 B2 | 3/2007 | Robertson et al. | |
| 7,209,949 B2 | 4/2007 | Mousseau et al. | |
| 7,225,411 B1 | 5/2007 | Stoner et al. | |
| 7,243,267 B2 * | 7/2007 | Klemm et al. | 714/38.11 |
| 7,302,634 B2 | 11/2007 | Lucovsky et al. | |
| 7,415,671 B2 | 8/2008 | Sylor et al. | |
| 7,472,101 B2 | 12/2008 | Aurora et al. | |
| 7,483,977 B2 | 1/2009 | Mikhailov et al. | |
| 7,493,363 B2 | 2/2009 | Huitema et al. | |
| 7,496,655 B2 | 2/2009 | Gopalan et al. | |
| 7,523,208 B2 | 4/2009 | Auerbach et al. | |
| 7,562,147 B1 | 7/2009 | Cohen | |
| 7,580,996 B1 | 8/2009 | Allan et al. | |
| 7,594,267 B2 | 9/2009 | Gladstone et al. | |
| 7,600,007 B1 | 10/2009 | Lewis | |
| 7,610,045 B2 | 10/2009 | Little et al. | |
| 7,664,724 B2 | 2/2010 | Lucovsky et al. | |
| 7,725,570 B1 | 5/2010 | Lewis | |
| 7,725,571 B1 | 5/2010 | Lewis | |
| 7,730,172 B1 | 6/2010 | Lewis | |
| 7,747,730 B1 | 6/2010 | Harlow | |
| 7,823,066 B1 | 10/2010 | Kuramura | |
| 8,037,153 B2 | 10/2011 | Montero | |
| 8,103,715 B1 | 1/2012 | Roberts | |
| 8,136,109 B1 | 3/2012 | Birdeau et al. | |
| 8,234,338 B1 | 7/2012 | Dagum et al. | |
| 8,621,480 B2 * | 12/2013 | Gootherts | 718/105 |
| 2002/0058532 A1 | 5/2002 | Snelgrove et al. | |
| 2002/0099759 A1 * | 7/2002 | Gootherts | 709/105 |
| 2002/0120717 A1 | 8/2002 | Giotta | |
| 2003/0018714 A1 | 1/2003 | Mikhailov et al. | |
| 2003/0065775 A1 | 4/2003 | Aggarwal et al. | |
| 2003/0110243 A1 | 6/2003 | Soulhi | |
| 2003/0115336 A1 | 6/2003 | Auerbach et al. | |
| 2005/0102677 A1 * | 5/2005 | Gootherts | 718/105 |
| 2005/0228711 A1 * | 10/2005 | Lahey et al. | 705/9 |
| 2006/0010492 A9 | 1/2006 | Heintz et al. | |
| 2012/0089661 A1 | 4/2012 | Roberts | |

OTHER PUBLICATIONS

Hayzelden, Alex L et al "Agent technology in communications system: an overview" Intelligent Systems Applications Group, University of London, (Jan. 1999).

Kiniry, Joseph et al "A hands on look at Java Mobile Agents", California Institute of Technology, Jul.-Aug. 1997., 21-30.

Jazayeri, Mehdi et al "Gypsy: A component based mobile agent system", Technical University of Vienna (May 3, 1999).

Vitria Technology Inc, BusinessWare BusinessWare®Connector Programming Guide—BusinessWare Connector SDK Version 1.0 updated Nov. 29, 2000.

Stoica et al., "Chord: A Scalable Peer-to-peer Lookup Service for Internet Application, Applications, Technologies, Architectures, and Protocols for Computer Communication" Proceedings of ACM SIGCOMM, Aug. 27-31, 2001.

Stoica et al., "Core-Stateless Fair Queueing: Achieving Approximately Fair Bandwidth Allocations in High Speed Networks", Proceedings of SIGCOMM '98, Sep. 1998. cited by other .Stoica et al., "Core-Stateless Fair Queueing: Achieving Approximately Fair Bandwidth Allocations in High Speed Networks", Proceedings of SIGCOMM '98, Sep. 1998. cited by other.

Dabek F., et al.: "Building peer-to-peer systems with Chord, a distributed lookup service", Hot Topics in Operating Systems, 2001, Proceedings of the Eighth Workshop on May 20-22, 2001, Piscataway, NJ, USA, IEEE, May 20, 2001, pp. 81-86. cited by other.

Day Mark et al, A model for presence and Instant Messaging Feb. 23, 2000, Internet draft.

Day Mark et al, Instatnt Messaging/Presence Protocol Requirements, Memo Feb. 2000.

OpenSig 2001 Programme, Imperial College, London, Sep. 24-25, 2001, "NetFuel Programmable Network Framework" Jim Harlow Co-Founder, NetFuel, USA.

Shoffner, Michael "Networking our whiteboard with servlets" JavaWorld Solutions, JavaWorld.com Jan. 1, 1998.

Crowcroft Jon., "Peer-peer and Application-level Networking", Online!, Sep. 14, 2001, pp. 1-32.

Randell Jim W3C Push Workshop, Sep. 8-9, 1997 "The Keryx Notification System" by Jim Randell, Hewlett-Packard Laboratories, Bristol.

NIST, Red-Black Tree, National Institute of Standards and Technology, at http://www.nist.gov/dads/HTML/redblack.html (last visited Mar. 5, 2002).

Stoica Ion et al., "REUNITE: A Recursive Unicast Approach to Multicast", in Proc. of INFOCOM2000, pp. 1644-1653, Mar. 2000. cited by other.

Roychowdhury, A. Moyer. "Instant Messaging and Presence for SIP Enabled Networked Appliances", (Publisher unknown), 2001.

Werthschulte K, G. Westermeir, F. Schneider. "Secured Data Transmission for Control and Supervision of an EIB Installation Using Mixed Network Topologies", Technische UniversitŠt München/EIB Event, 2001.

Van Hoff, Arthur, CTO, Marmba Inc, "The HTTP Distribution and Replication Protocol" W3C Push Workshop, Sep. 8-9, 1997.

Umar Amjad, Bellcore "Push Technologies in low bandwidth and highly mobile environments" W3C Push Workshop, Sep. 8-9, 1997.

De Jong, Gerald, Javaworld.com, "Subject-oriented programming through RMI" JavaWorld—Aug. 1, 1998.

Erdelsky, Philip J, "The Birthday Paradox", Jul. 4, 2001, internet.

* cited by examiner

MANAGING COMPUTER NETWORK RESOURCES

This application is a continuation of U.S. patent application Ser. No. 13/363,203 filed on Jan. 31, 2012.

FIELD OF THE INVENTION

This invention relates to computer networks. In particular, it relates to the management of computer networks.

BACKGROUND

Computer networks need to be constantly managed in order to ensure smooth and efficient operation. Such management typically includes ensuring robustness (i.e. the ability of the network to continue operating even if nodes fail), quality of service (QoS), scalability (i.e. the network must operate regardless of the number of nodes), etc.

Typically, network management is performed by humans or is, to a large extent, dependent on human input. This is undesirable, particularly, for example, in the case of a network having a large number of nodes because of the time it would take a human to identify and fix a failed node.

It is therefore desirable that networks run themselves as much as possible.

DETAILED DESCRIPTION

The invention pertains to the management of computer networks. According to one embodiment of the invention, a method of managing a computer network uses software agents. The software agents operate within an agent runtime environment (hereinafter referred to as an "ARE") which is hosted on a particular network (host) device. Each ARE allows agents operating therein to communicate with the host device, with other agents, and with an agent control mechanism. Each agent has at least one assigned goal which is expressed in the form of policy and which can be dynamically modified based on desired operational characteristics of the network.

System Overview

Figure 1:
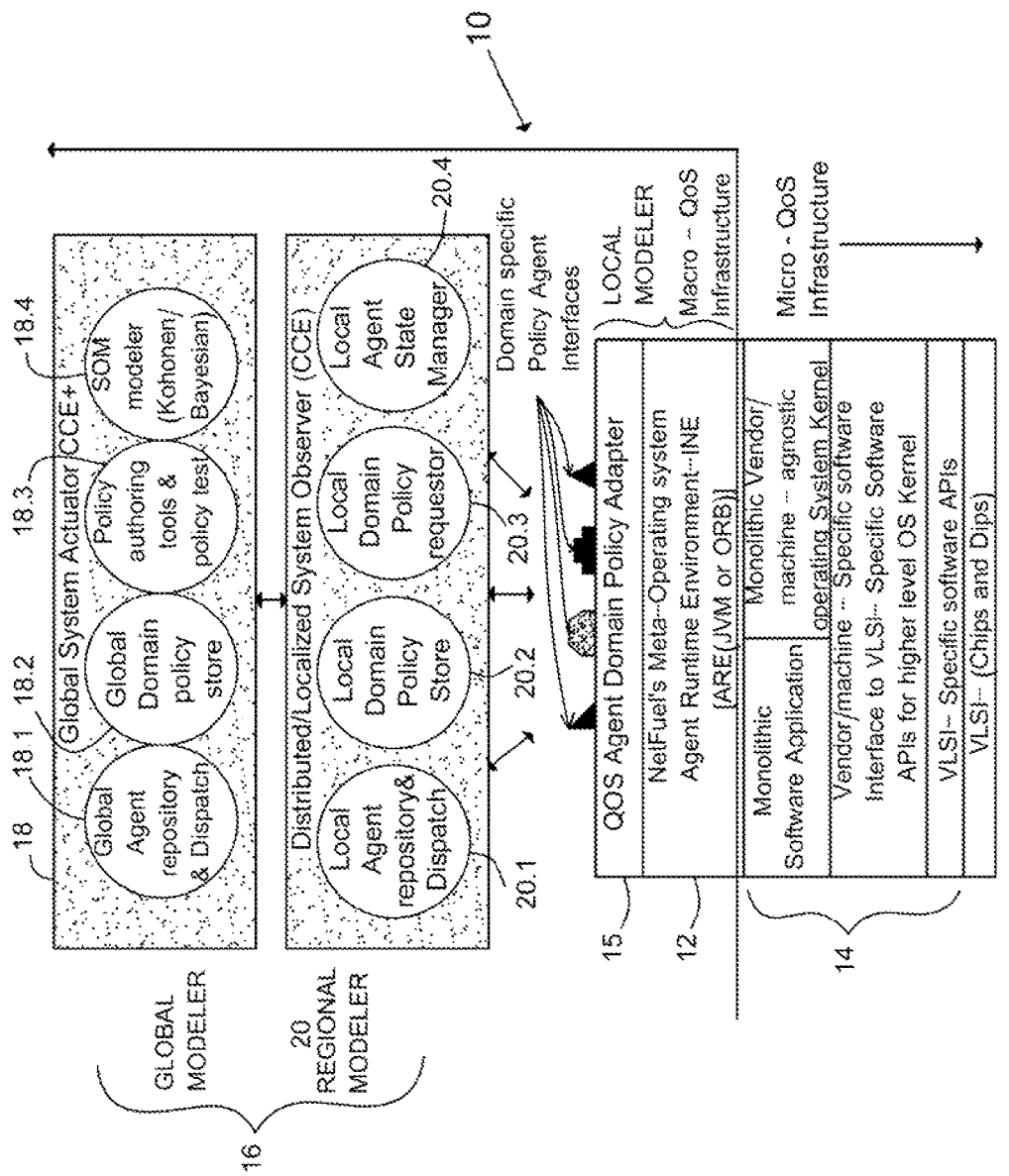
FIG. 1 shows a schematic drawing of a system for managing a, network in accordance with the invention.

FIG. 1 shows a schematic drawing of a system 10 for managing a network in accordance with the invention. The system 10 is vertically layered comprising an ARE 12 which is loaded on a host platform 14 defined on a network device. Operating within the ARE 12 are a number of agents. As will be described in greater detail below, agents may perform discovery, monitoring, and policy enforcement functions. The upper most layer of the system 10 is occupied by an agent control mechanism 16 which comprises a $CCE^+$ layer 18 sitting on top of a $CCE^-$ layer 20 (CCE denotes a coherent computing entity). The $CCE^+$ layer 18 defines a global system actuator comprising a Global Agent Repository and Dispatch Module 18.1, a Global Domain Policy Store Module 18.2, a Policy Authoring Tools and Policy Test Module 18.3 and a Modeler Module 18.4. The $CCE^-$ 20 defines a distributed/localized system observer comprising a Local Agent Repository and Dispatch Module 20.1, a Local Domain Policy Store Module 20.2, a Local Domain Policy Request Module 20.3 and Local Agent State Manager Module 20.4.

Each layer of the system 10 masks the complexity of the layers below it and may be configured to provide guaranteed services to the layers above it. Thus, at one level, the system 10 may be viewed as a macro-quality of service (QoS) infrastructure with the host platform 14 defining a micro QoS infrastructure.

Typically, the system 10 is implemented on a large network comprising a number of network devices, each hosting an ARE. The AREs are able to create/instantiate, suspend operation of the agents, and terminate the agents. Each agent has one, or more, assigned goal which is expressed in the form of policy. The module 18 provides a user interface, preferably in the form of a Graphical User Interface (GUI) which allows policy to be input and stored in module 18.2. Policy may be seen as the desired operational characteristics of a network on which system 10 is installed. Alternatively, policy may take the form of a Service Level Agreement (SLA) which is a documented result of a negotiation between a customer/client and a service provider, that specifies the levels of availability, serviceability, performance, operation or other attributes of the service being provided using the network. Once policy is input into the $CCE^+$ 18 it is disseminated through the various layers until it reaches the various agents seized with the task of implementing policy.

The system 10 is dynamic in that the agents monitor various operational characteristics of the network devices and report these characteristics to the CCE⁺ 18. This information is used by the global modeler module 18.4 to model network behavior. The module 18.3 allows test policy to be written and the effects of such test policy on the system 10 may be determined by using numerical modeling techniques in the module 18.4. In this way, policy may be tested before implementation in order to determine optimal policy. The policy being implemented by the various agents may then be replaced dynamically with the optimal policy. The module 18.1 maintains a registry of all agents in the system 10.

Because the network on which the system 10 is installed may be large, it is preferable to divide the network into a number of functional/management domains. For example, the various departments of a company may each form a functional domain, or discrete business units may represent functional domains. The CCE⁻ 20 may be viewed as a control mechanism for a particular functional domain. Accordingly, the Local Agent Reporting and Dispatch Module 20.1 maintains a registry of all agents in a particular functional domain. The relevant policy is stored in module 20.2. Module 20.3 allows the CCE⁻ 20 to request domain specific policy from the CCE⁺ 18 where appropriate. The module 20.4 stores the state of each agent within a functional domain. The state of an agent may be active or passive. Each device within a functional domain has a domain adapter 15 which facilitates communications between the CCE⁺ 20 and the AREs in a particular functional domain.

The system 10 further includes a secure messaging service/subsystem which will be described in detail below.

In terms of the mechanics of policy handling and distribution within the system 10, the CCE⁺ 18 may be regarded as a global modeler, the CCE⁻ 20 as a regional modeler, and the combination of each domain adapter 15 and its associated ARE 12 as a local modeler as discussed below. As will be described in greater detail below, agents are used to monitor various operational parameters of the system 10 and to apply corrective policy to change these operational parameters should they deviate from established limits. For example, suppose that a particular network device has deviated outside its normal operational parameters. In this case an agent seized with the task of controlling this device will first determine whether it has the necessary corrective policy to change the operational parameters of the device. If the agent has the necessary corrective policy then it will apply it to control the device. However, if the agent lacks the corrective policy then it will request the corrective policy from the particular ARE within which it is operating. If this ARE does not have the corrective policy then an attempt will be made to obtain the corrective policy from other agents and AREs operating within the particular functional domain. Should this prove unsuccessful then a request will be made to the CCE⁻ 20 for the corrective policy. The CCE⁻ 20 will respond by either supplying the corrective policy to the agent or it would obtain the corrective policy from the CCE⁺ 18, if it does not have the corrective policy. Thus, it will be seen that system 10 implements a competence based control flow mechanism wherein, in responding to a situation which requires corrective action, an agent will first attempt to take the appropriate corrective action, should it have the appropriate corrective policy. If the agent lacks the corrective policy it will request it from its host ARE, or other agents within its functional domain, or the CCE⁻ 20, or the CCE⁻ 18, as the case may be, and in the particular order as recited above.

Advantageously, the present invention may be employed in a wide variety of network applications. For example, the present invention may be used to implement self-stabilizing networks, or to perform load balancing, etc.

The various components of the system 10 are now described in greater detail.

The ARE

Each ARE 12 provides an open architectural framework or shell into which existing policies may be plugged by a network administrator, depending on the functional domain under consideration. In various embodiments an ARE 12 is implemented as a Java Virtual Machine (JVM) or an Object Request Broker (ORB), or as a vendor specific interface which lacks the capacity to host an ARE. Equally, an ARE 12 may be implemented using remote procedure calls in a Common Object Request Broker Architecture (CORBA) framework. In some cases a host device may be unable to support an ARE or an agent running on it. In these cases, the nearest ARE, defined as the ARE with which the shortest communication path may be established, is used to provide a proxy for that host device. A particular advantage of the present invention is that it is able to lever a JVM and/or ORB to provide an environment in which the agents can operate independently of the underlying hardware and operating system in which the ARE is located. Each ARE 12 provides a uniform context and set of services that agents can rely on, thereby acting as an operating system for the agents.

Figure 2:
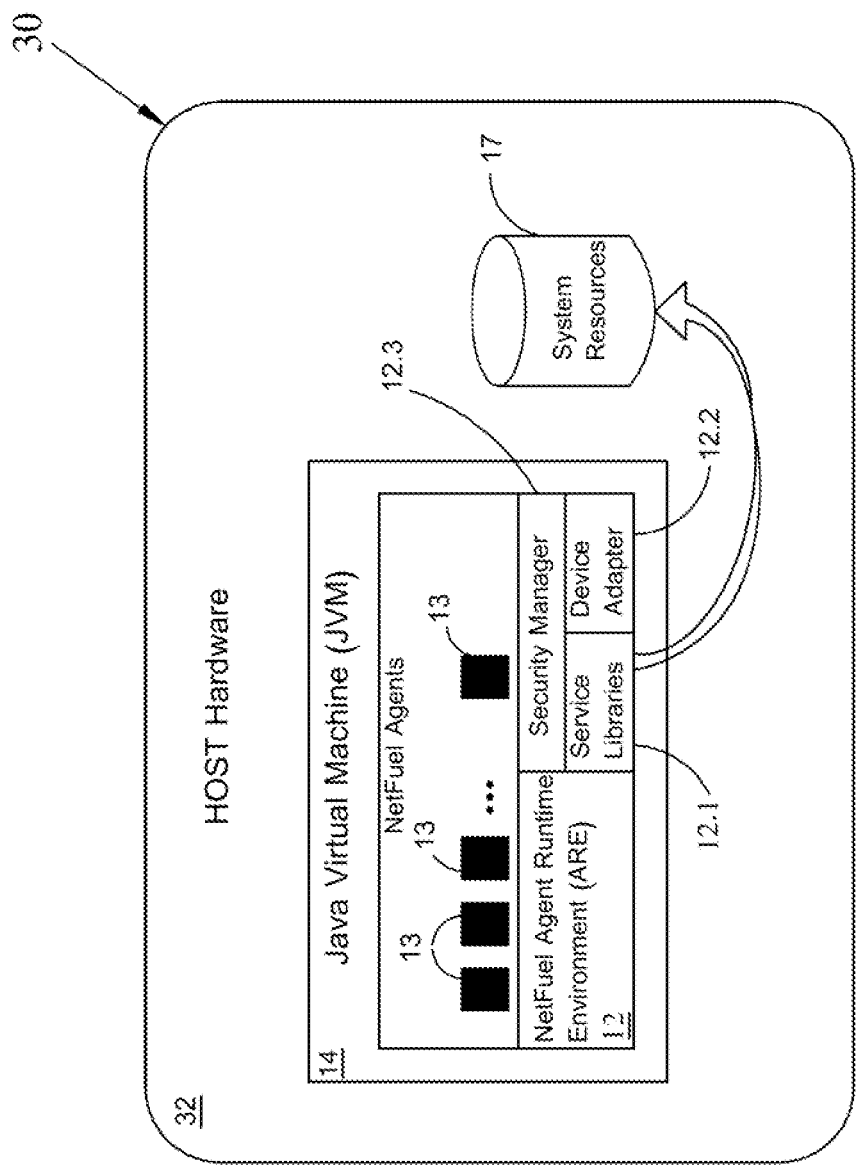
FIG. 2 shows a schematic drawing of the components of an agent runtime environment.

FIG. 2 shows a schematic representation of the components of an ARE 12 hosted on a host device 30. Running within ARE 12 are a number of agents 13. As can be seen, the host device 30 includes host hardware 32 which is the physical platform on which the ARE 12 is hosted. The host device 30 may be a computer, a switch, a router, a server, etc. According to one embodiment of the invention, the ARE 12 is written in C but is wrapped in Java in order to allow it to run on a Java Virtual Machine (JVM) 14. This allows the ARE 12 to run on a variety of hardware and operating systems without having to be customized for each physical combination of platform and operating system.

Reference numeral 17 indicates system resources which are available to the ARE 12 and agents 13. Typically, the system resources 17 may include firewall systems, network interface cards, routing planes, network processors, and the like. The ARE 12 further includes a set of service libraries 12.1 which provides the agents with access to common services such as a messaging subsystem, class loader, etc. These services will be described below. The ARE 12 also includes a device adaptor 12.2 which provides a generalized interface to a variety of device types. While the service library 12.1 provide interfaces to common services such as a communication layer which is available on each host device, the device adaptor 12.2 provides an interface to host-specific resources, such as a network forwarding plane. Each host device 30 has its own version of a device adaptor 12.2 which configures a generalized device interface to specific commands needed for that particular device.

The ARE 12 further includes a security manager 12.3 which controls agent access to the service libraries 12.1 and the device adaptor 12.2. The security manager 12.3 ensures that resources are only used by authorized agents. Additionally, the security manager limits the rate at which particular agents may use a resource.

Figure 3:
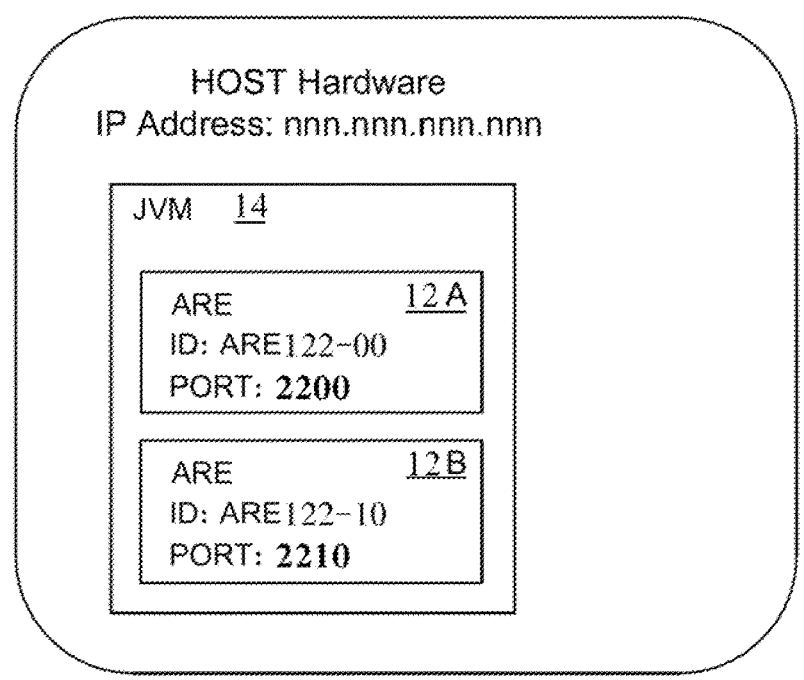
FIG. 3 shows a schematic drawing of two agent runtime environments installed on a host device.

It is possible that more than one ARE 12 may run on a single host device, as is shown in FIG. 3 in which ARE 12A and 12B are shown installed on a JVM 14 which is running on a host device. The ARE 12A has a unique ID which is used to identify and reference it to policies that are to be enforced on the network. Each ARE 12A, 12B has a unique communications port ID assigned to it. Port assignments for AREs are configurable by command line arguments or system boot configuration files. The command line arguments or system boot files may be in the same format.

Policy changes are monitored by the agents 13 which listen on port ranges which are also dynamically controlled. The security manager 12.3 is responsible for encryption/decryption of secured connections within the system 10. Each ARE 12 uses a cryptographic subsystem which may be selected by a system administrator using a configuration manager or a configuration file loaded locally on an ARE 12.

ARE-to-agent, agent-to-agent, and ARE-to-ARE communication is performed via a messaging service. The messaging service assumes that both the agents and the AREs are able to decipher the messages that are addressed to it. Details of the messaging service are provided later.

As part of the service libraries 12.1, each ARE 12 supplies to each of its agents a set of utility classes which are usable by the agents running on the specific ARE 12. However, before using the utility classes, an agent is required to have permission from the security manager 12.3.

Each ARE 12 facilitates initialization of the agents 13 by running an auto configuration discovery process. This process requires each ARE to broadcast (upon its startup) a registration request to a topology service (which will be described in detail below) which responds to the request with the necessary information for the ARE to communicate with a network configuration server, policy server, etc. (as will be described in greater detail below).

Each ARE 12 is responsible for locating a route to various topology servers running the topology service via a multi-cast boot configuration service. This service provides information on how to find critical services required to operate an ARE.

Figure 4:
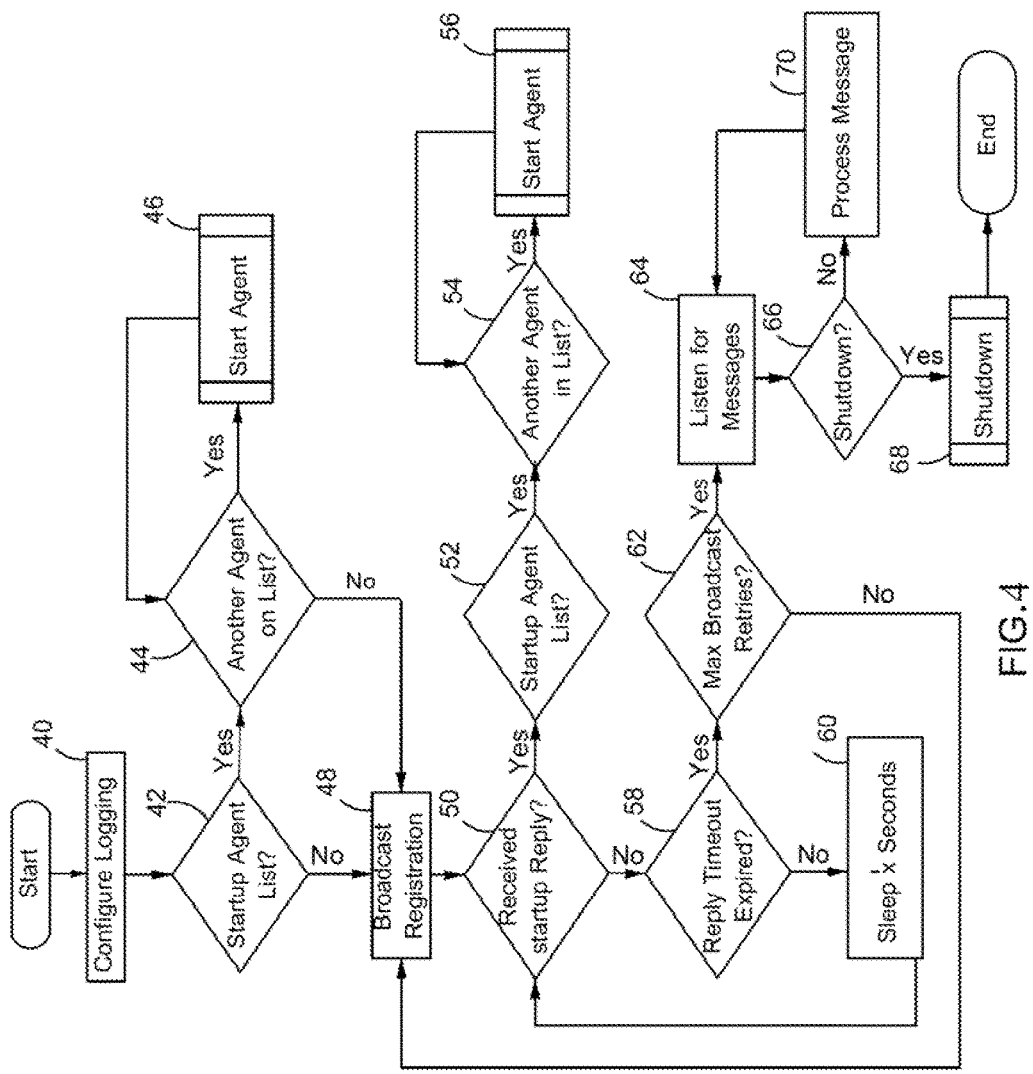
FIG. 4 shows a flowchart of the startup method for an agent runtime environment and the operation of the agent runtime environment.

FIG. 4 shows a flow chart of a startup method for an ARE 12. The startup method is executed by the device hosting the ARE 12. Referring to FIG. 4, at block 40 an ARE 12 configures a logging process used to log system messages, errors, etc. At block 42, the ARE checks for a Startup Agent List which is a list of agents, such as may be provided on the command line to the ARE at startup. If such a list exists, agents on the list are started one at a time by executing a start-agent process which includes a loop comprising starting an agent at block 46 and checking for another agent in the list at block 44 until all agents in the list have been started. If no Startup Agent List exists, the ARE assumes it is to run in a stand-alone mode i.e. the ARE assumes that network resources are unavailable and sets itself up to run autonomously. At block 48 the ARE broadcasts a multi-cast registration message to any topology server to register itself and obtain messaging information necessary to communicate with the configuration manager. This broadcast includes the 10 of the particular ARE, the network address of the host machine on which the ARE is running, and the port number used for communications by the ARE. At block 50 the ARE checks to see if it has received a Startup Reply from a topology server. If no Startup Reply is received, at block 58 a check is performed to see if a predetermined time within which the Startup Reply is expected has expired. If a Startup Reply is received, at block 52 a determination is made as to whether the reply includes a Startup Agent List. If it does, a loop is entered comprising starting an agent at block 56 and rechecking the list at block 54 until all agents in the list have been started. If at block 58 the predetermined time has not expired, at block 60 the ARE waits or sleeps for the unexpired portion of the predetermined time. If the predetermined time has expired, at block 62 a check is performed to see if a predetermined maximum number of broadcast retries have been exceeded. If not, block 48 is re-executed. If the predetermined maximum number of broadcast retries has been exceeded, at block 64 the ARE listens for messages. At block 66, the ARE determines whether a received message is a Shutdown message. If the received message is a Shutdown message, at block 68 the ARE shuts itself down; otherwise, at block 70 the ARE processes the message and repeats the process starting at block 64.

The processing represented by block 70 includes:

(a) maintaining a list of all internal resources and services available to it and the agents operating within. This includes all agents that are currently running, proxied, or suspended;

(b) keeping a systems history log for each agent started;

(c) routing messages to and from agents it hosts. Each ARE 2 understands when an agent is referring to a local external agent residing on another host as opposed to an agent already running in the ARE 12. Accordingly, each ARE knows how to route messages between the various agents;

(d) performing start-up services required for proper agent operation prior to loading/instantiating/running any policy agent (as will be described below);

(e) starting the necessary agents and services upon a request from an authorized local or external agent requiring it to instantiate a particular agent not already instantiated. The particular ARE in which the requesting agent is running performs a check via its security manager to see if the requesting agent has permission to access this type of agent/service on either the current ARE or on a remote ARE;

(f) keeping a master thread group that starts, stops and resets agents within its control;

(g) requesting other external thread groups on other AREs to start, stop and reset proxied agents only if they have the appropriate authorization. A master thread group within each ARE 12 has the ability to control the priority of each agent in a thread group. This priority is set by the master thread group depending on the type of agent being run and the policies being enforced by that agent. The master thread group starts up everything within an ARE. This means that all agents and services started within the ARE are boot strapped using the master thread group. The master thread group will pass into each thread group standard environmental settings to run within the thread group—Thread utilization is administered by a subsystem called a proxy thread manager not shown that acts as a thread controller and mediator for interaction between agents and threads. Each agent can be pacified, by the proxy thread manager, and it's thread made available to active agents in the event of such pacification. In other instances agents can simply return a quiet thread to the proxy thread manager pool for use by other agents; and (h) suspending an agent after the agent has registered itself with the ARE, in order to conserve thread and resource usage since an agent does not need to be active until required, and reinstating the agent when the agent's services are required.

Figure 5:
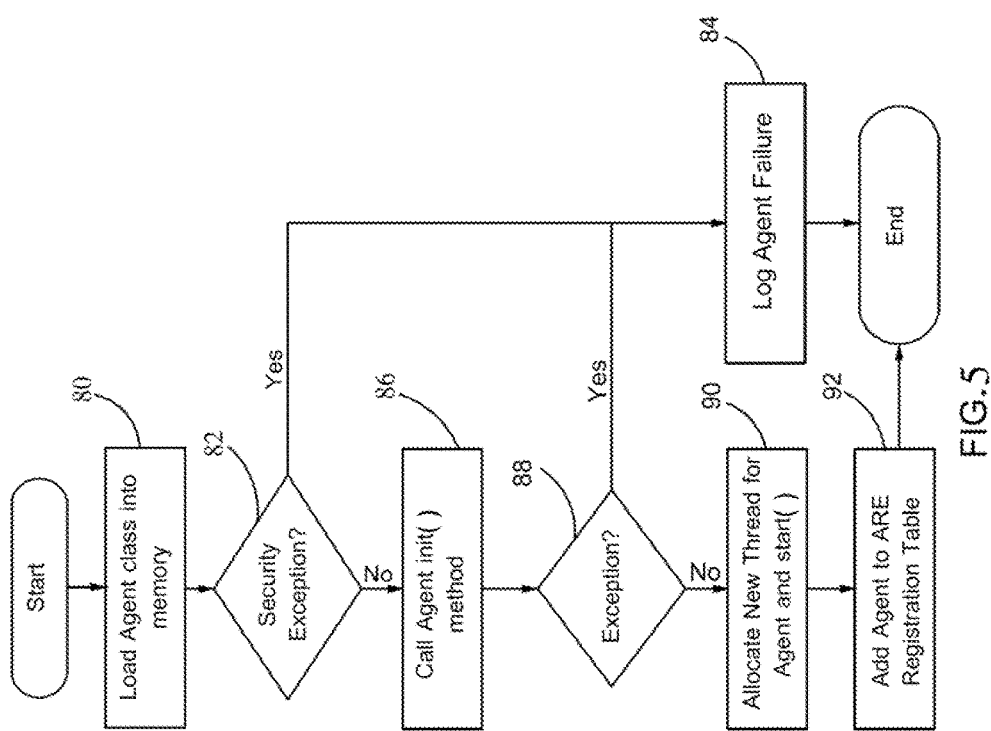
FIG. 5 shows a flowchart of an agent start-up process.

FIG. 5 shows a flowchart of an agent startup process executed by an ARE. In one embodiment the agents are defined by agent code written in Java, wherein the Class construct in Java is used to define an Agent Class. Referring to FIG. 5, at block 80, the AREs 12 load the agent code, and any code the agent code is dependent on, into memory.

During loading and at block 82, the security manager 12.3 verifies that access to the agent code is allowed. If the ARE does not have permission to access the agent code, or other code on which the agent code is dependent, then a security error is generated at bock 84 and the ARE 12 logs an agent load failure. If no security error is generated, at bock 86 an agent initialization process is called prior to calling an execution process. The agent initialization process allows any initialization tasks to be completed before execution of the agent code begins. Error messages generated during agent initialization is detected at block 88 and at block 84 an agent initialization failure is logged. If no error messages are generated during agent initialization at block 90, the ARE 12 allocates a new thread of execution for an agent and executes a threat-start process, which executes the agent code. Each agent executes its own thread, which is separate from the main thread of the ARE and any other agents. At block 92 the agent is added to a registration table in the ARE 12.

Figure 6:
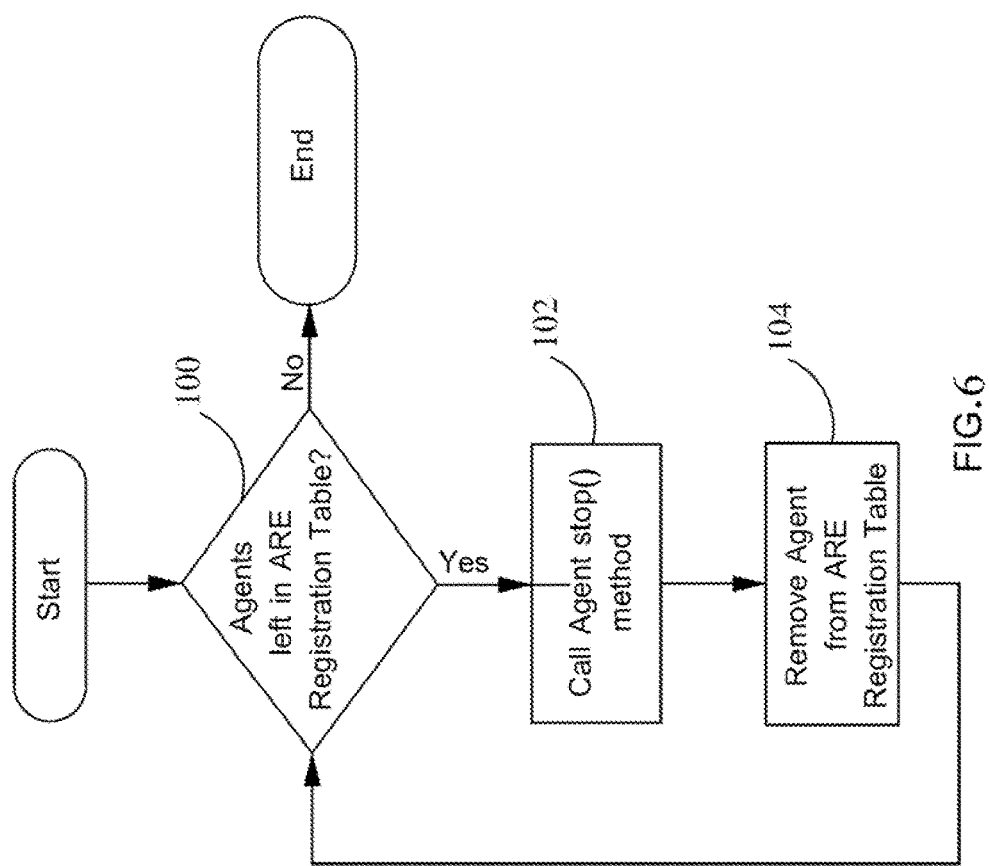
FIG. 6 shows a flowchart of the process of shutting down an agent runtime environment.

The process of shutting down an ARE is shown in FIG. 6. Referring to FIG. 6, at block 100 a check is performed to see if there are any agents left in the registration table. If no agents are left the agent shutdown process is complete and the ARE terminates. Otherwise, at block 102 an agent stop process is called which stops execution of agents. At block 104 details of the agent whose execution was stopped are removed from the registration table. Returning at block 100, the shutdown process is repeated until there are no agents left in the registration table.

Agents

As used herein the term "agent" denotes a program that performs some type of operation, which may be information gathering or some processing task, in the background. A foreground process is one that accepts input from a keyboard, mouse, or other input device whereas a background process cannot accept interactive input from a user, but can access data stored on a disk and write data to a display. In particular, a software agent is a virtual entity which: (a) is capable of acting in a runtime environment; (b) can communicate directly with other agents (messaging); (c) is driven by a set of tendencies (expressed in the form of individual objectives or of a satisfaction/survival function which it tries to optimize or policy); (d) possesses resources of its own (logic and algorithms); (e) is capable of perceiving its environment (state); (f) has only a partial representation of its environment; and (g) is able to reproduce/clone itself.

An agent tends to satisfy its policy directives taking account of the resources and logic available to it, and depending on its perception of its state, its representations, and the communications it receives.

According to embodiments of the invention, agents may be simple (or static and narrow in scope). Alternatively an agent may be complex (mobile, intelligent and autonomous). A simple or static agent is one which is always located in a particular ARE. In other words, it is static within the environment of the ARE. On the other hand, a complex or mobile agent is one which is trusted to migrate to other AREs hosted by other network devices.

According to embodiments of the invention, agents may be autonomous and/or intelligent. Both intelligent and autonomous agents have a degree of sophistication which allows them to algorithmically interpret the state of their environment and to perform tasks independently without human interaction. They possess representations of their environment and inference mechanisms which allow them to function independently of other agents. The difference between intelligent and autonomous agents ties in the scope of the representation of the environment that they possess, an intelligent agent having a greater representation of its environment than an autonomous agent. Accordingly, an intelligent agent is able to solve complex problems without reference to outside entities whereas as an autonomous agent is able to independently solve complex problems up to a certain level beyond which the autonomous agent will have to request further policy or data from an outside entity such as the agent control mechanism 16 of FIG. 1.

As discussed above, mobile agents can migrate under their own control from machine to machine in a heterogonous network. However, mobile agents cannot act on their own on any platform without external activation messages. In other words, a mobile agent can suspend its execution at any arbitrary point, move to another machine and resume execution there only after receiving a dispatch message from the agent control mechanism 16. The primary reason for this is that a mobile agent is not provisioned to act upon its new environment and must thus wait for the necessary algorithms and logic to be received before migrating.

As will be appreciated, mobility is a powerful attribute for an agent as it allows an agent to perform tasks such as information gathering in a network which includes a distributed collection of information resources. Further, by being able to migrate to a particular network location, a mobile agent eliminates all intermediate data transfer and can access a resource efficiently even if the resource provides only low level primitives for working within it. This is beneficial, particularly in a low bandwidth network where instead of moving the data to a computational resource it is more practical to move the computational resource to the data.

Mobile intelligent agents are able to migrate under their own control from machine to machine in a heterogonous network without waiting for external activation messages.

A further attribute of intelligent and autonomous agents is that they have the capacity to anticipate future events and to prepare for them. These agents are able to use a capacity for algorithmically induced reasoning based on representations of the environment to memorize situational parameters (data points), analyze them, and request additional algorithmic components (policy from the agent control mechanism). In the event that there is a conflict in goals between these agents, these agents are able to negotiate among themselves to determine which goals/policy are more relevant to satisfy needs.

Agent Structure

Figure 7:
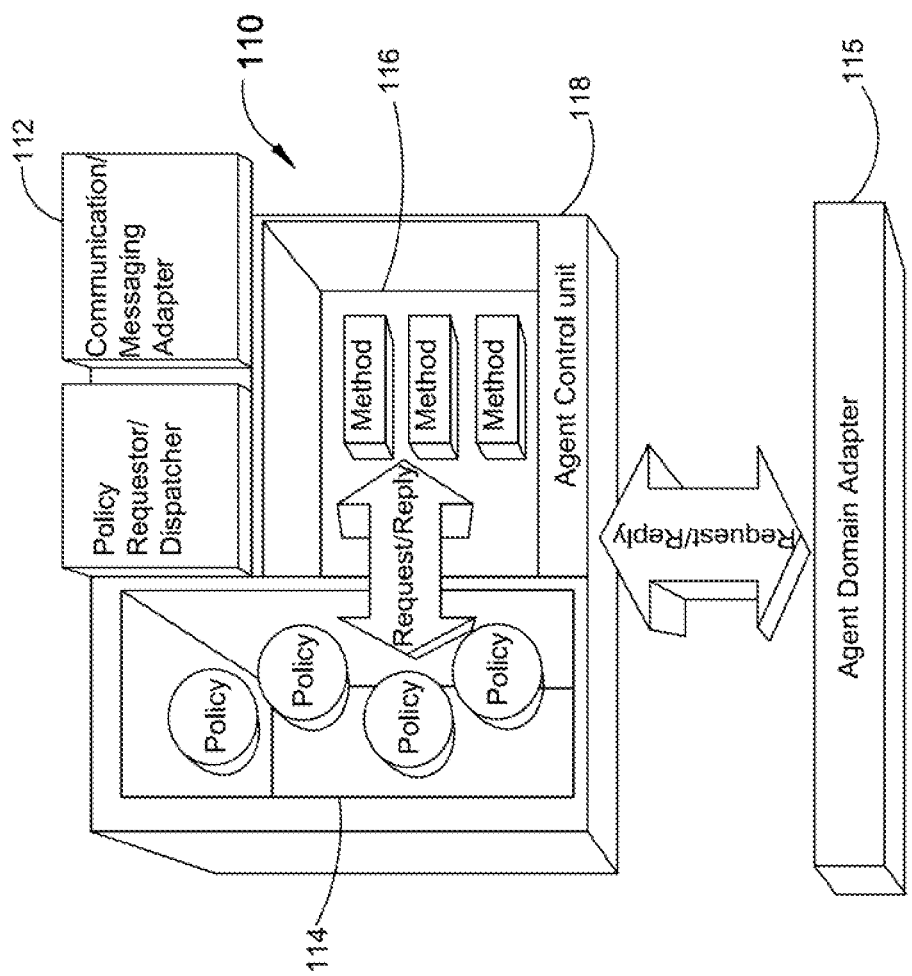
FIG. 7 shows a schematic drawing of the generic structure of an agent.

FIG. 7 shows the broad generic structure of an agent 110 according to one embodiment of the invention. The agent 110 includes a messaging adapter 112 which provides the functionality of sending messages to and receiving messages from other agents, AREs and components of the agent control mechanism 16. Sending messages is a specific type of action for which there is policy. On the other hand, receiving messages is implemented as a sensing process which models a receive-queue.

The messaging adaptor 112 may be implemented, for example, using the Transport Layer Security (TLS) protocol. One advantage of TLS is that it is application protocol independent. Higher level protocols can layer on top of the TLS Protocol transparently.

The agent 110 further includes a policy repository 114 which contains agent specific policy that is necessary for the operation of the agent 110. This policy is obtained from the policy stores of the $CCE^+$ 18 and the $CCE^-$ 20.

The policy repository 114 of agent 110 may be implemented using a Lightweight Directory Access Protocol well-known (LDAP) directory structure. LDAP uses LDAP directories to implement Public Key Infrastructure (PKI) security. From a user's point of view, LDAP provides the directory in which the certificates of other users are found, enabling secure communication. From an administrators point of view, LDAP directories are the way in which certificates can be centrally deployed and managed.

Alternatively, a Policy Knowledge Base (PKB) model may be used. PKB policy reporting offers three types of interface services: assertional services, retrieval services, and active information services. Assertional services allow agents to assert new beliefs (policy) into the knowledge base, (i.e., to create instances of policy, and to change the values of attributes of existing policy instances). Retrieval services provide access to policy that is actually stored in the agent knowledge base. Active information services offer access to information in the knowledge base upon demand. Requesting an active information service starts a monitoring process that recognizes specific changes in the knowledge base and sends information about these changes to the requesting process, i.e., to specific control layers.

The agent 110 further includes a policy repository 116. In one embodiment all agents are instances of an Agent Class described in Java. A number of methods are written for the Agent Class to add functionality to agents based on the policy the agent is required to implement. The method repository 116 is a store of all such methods for an agent 110.

The agent 110 further includes a control unit 118. The control unit 118 executes policy using relevant methods from the policy repository 116 to calibrate, execute, activate, respond and deactivate specific actions based on policy.

Atomic actions are actions whose execution is started and then either succeeds or fails. The execution of continuous actions initiates a control process which will run until explicitly finished, suspended, or deactivated. Examples of these types of actions are actions such as activating a control algorithm to make a router shut down a port upon detecting attack.

Included in the agent control unit 118 is a method requestor/dispatcher which is defined by a generic "Layer" object. The main method of the Layer Object describes a "sense-recognize-classify-invoke method" cycle. In each loop of this cycle the current policies of the agent 110 are scanned for new relevant situations relative to a current system state. These situations, together with the messages received from the next lower layer (which defines the domain adapters 15) are used to compute new options for the agent 110. These options are then passed to the CCE⁻ 20 (or CCE⁺ 18 if necessary), which is responsible for making decisions (i.e., for selecting appropriate operational primitives and for updating the policy structure) and for scheduling and executing those decisions which are expressed in the form of new policy. In particular, this mechanism decides whether a layer will deal with a specific goal problem by itself, or whether it will pass the goal up to the next higher control layer. In the former case, the layer decides what new policy to make in order to achieve the goal and schedules the new policy for execution. The execution of new policy is linked to the situation recognition process: when an action is executed, a reactor is activated which monitors the expected effects of the action.

The fundamental activity cycle comprises updating policy, situation recognition, goal activation, a generation of situation-goal pairs as input a planning, scheduling, and execution process, a competence check including the set of situations and goals into a subset for which the layer is competent and for which plans are generated and executed by the layer, and into another set for which the layer is not competent, and for which control is shifted to the next higher layer.

As shown in FIG. 7, agent 110 communicates with a domain adapter 115 which may be represented as an object providing methods for sensor calibration, enabling and disabling sensor activity, and for reading current values relevant to the respective domain.

Current sensory values are made available to the agent control unit 118 by a perception buffer from which the values of sensors can be read, and which can be explicitly updated. The perception buffer itself calls the methods offered by the individual sensors, e.g., in order to read the current sensory information.

There is a flow of information between the policy repository 114 and the AREs, the CCE⁻ 20, and the CCE⁺ 18. New policy derived from an agent's perception is sent to the CCE⁻ 20 and entered into a PKB located in the Local Domain Policy Store 20.2. In the event the CCE⁻ 18 determines that an ARE operating within its functional domain needs to be provisioned with a new policy, it "pushes" to a PKB in the relevant ARE which then "pushes" the new policy to specific agents if necessary.

Each agent control unit 118 continuously accesses information from the repository 114. The situation recognition processes at the different layers of system 10 evaluates environmental parameters in order to determine whether new policy is required. This involves a planning process which evaluates preconditions of actions.

According to other embodiments of the invention, an agent control unit 118 may modify the policy repository 114 by signaling first to its associated ARE, and subsequently to the CCE⁻ 20, a demand for new policies. The derivation of new policy, which is known as knowledge abstraction may be anchored either in the PKB or in the control unit of the agent. The former alternative describes the knowledge base of an agent as an active, blackboard-like system, whereas the latter alternative corresponds to the view of a classic Artificial Intelligence (AI) planning system. The performed alternative depends on the power of the inferential services provided by the knowledge base in repository 114.

General Characteristics of Agents

As will be appreciated various implementations of the agents are possible, however each of the agents will have the following general characteristics:

(a) agents assume a secured environment already exists wherever they run (there is only one Security Manager per ARE);

(b) each agent assumes certain services (such as a Logging Component, Security Manager, Device Adaptor, class loader, etc. . . . ) are available to it from the ARE.

(c) agents assume there is a (limited) statically defined relationship hierarchy between other agents at runtime which are defined in part by the messaging service, modelers, policies, and a topology service;

(d) agents assume that all system resources are freely available and if a resource is available to an agent, the agent has permission to use the resource unless otherwise restricted by the security manager 12.3;

(e) each agent has a unique ID within the ARE in which it operates and which, when coupled with the ARE's unique ID, defines a unique agent name; a Globally Unique ID (GUID) generator generates an Agents unique ID.

(f) each agent maintains information regarding its management status and the management domain under which it is being administered;

(g) an agent's management domain state may be defined in one of three ways, viz. Controlling, Subordinate, or Not Applicable (NA). With Controlling, the agent acts as a Policy Decision Point (POP) i.e. a logical entity that makes policy decisions for itself or for other network elements that request such decisions. With Subordinate, the agent refers the policy decision point to another agent. With Not Applicable, the agent ignores any policy decision requests made to it by the system 10;

(h) each agent is assigned a named thread group upon creation;

(i) each agent is passed shared variables used to facilitate inter-Process Communications (IPC) messaging transfer between a master message queue and each agent's message queue;

(j) each agent upon instantiation is assigned a thread priority level by the ARE, which will be determined by policy and agent class type being instantiated;

(k) agents register with the local ARE when instantiated; and (l) agents have the ability to be passivated and/or re-activated by the ARE.

As discussed above each ARE has the ability to provide feedback on the per-thread utilization of each thread running within it. This information is used by the CCE⁻ 20 to, for example, help determine load balancing on the ARE's.

Agent Behavior

Agents are used to enforce specific actions/behavior on hardware/software devices controlled by the system 10. Agents have both a policy-enforcement-point (PEP) i.e. a logical entity that enforces policy decisions, and a policy-decision-point (PDP) aspect. In combination with the local modelers, each agent may be viewed as a PDP. Agents use an event notification system whereby policies are setup as alerts to be monitored within the local modelers, which notifies the appropriate agents that a policy SLA is not within its desired operational range. Agents use a two stage feedback mechanism, which links the local modelers to the agents to provide the alert notification feedback loop required to monitor device/application evaluation and administer corrective actions within the network for a given network state.

Agents depend on each ARE to route messages within an ARE to other agents either within the same ARE or on other AREs, which can be either running on either the same or different machine. Agents are able to request both local and remote network resources that are registered within an ARE. Agents rely on their associated local modelers to replicate fault tolerance behavior and state information to other local modelers running on different machines. This is used in conjunction with the topology service to replicate state across the functional domains of system 10.

When agents initialize, they register themselves with their associated ARE and local modeler. Each agent registers its policy/SLA requirements. The local modeler then sets up a listener to listen for a particular polling agents ID, and relays its feedback information with the local modeler. The agent's action commands are called by the local modeler when information from a monitoring agent indicates the agent's policy/SLA is no longer within its operational range.

Agents in conjunction with the associated local modelers set up feedback processing loops to monitor policy within the device being controlled.

In order for an agent to implement policy it may need to request services that are not currently running or loaded on the local ARE host. If the local ARE cannot support such an agent request, a request to the topology service is made to find a remote ARE that is either running or can run the required service. If the security check passes for the requesting service, the service is either started on the remote ARE or the ARE attaches to the existing remote service. The remote ARE then proxies back the service to the local ARE requesting the service. If the requesting service cannot be started anywhere within the system 10, the agent sends back an exception indicating the required service could not be started. This exception is sent along a system alert handling interface developed for the AREs.

When an agent loads a device adapter, it makes a security access call to verify that (a) the classes or libraries needed to communicate and control the device to be managed haven't been altered and (b) the agents device adapter has rights to resources the classes and libraries are accessing.

The means of communication between ARE-to-Agents, Agent-to-Agent, and ARE-to-ARE is the messaging service. Each sending agent has to determine if a receiving agent is receiving and acknowledging the sending agent's request.

Once the agents have set up the initial policies and configurations they are then passivated by the ARE (i.e. the agent's thread is suspended) so as to conserve resources within the ARE.

Having broadly described generic agents in the system 10, specific embodiments of agents will now be described.

Discovery Agents

The system 10 includes discovery agents which are used to examine and determine the capability of a network device (host) and the equipment or components of the device. Each discovery agent then reports this information to a topology server so that the system 10 can use the information to construct a topological representation of the network.

A simple or static discovery agent might, for example, simply start executing when a device is first powered up and thereafter will look for any new device components or changes in capability to existing components, report the information to the topology server and thereafter terminate. This allows the system 10 to know about equipment changes, such as the adding of a new processor, more memory, or a larger disk to a device. Discovery agents may be written to check for new components or capabilities deemed important to the operation of the devices.

Figure 8:
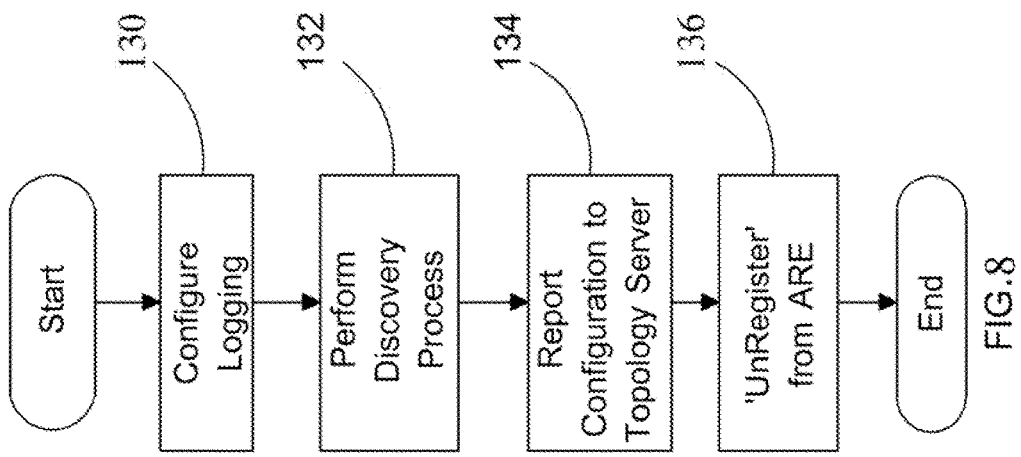
FIG. 8 shows a flow chart of the lifecycle of a simple discovery agent.

The life cycle of a simple discovery agent is shown in FIG. 8. Referring to FIG. 8, at 130 a configure logging process is performed. At 132 the discovery agent performs the discovery process. At 134 the agent reports the discovered configuration to a topology server and at 136 the discovery agent unregisters the ARE.

Policy Agents

The system 10 also includes policy agents which are used to enforce or implement specific policy. Policies defined in the system 10 are parsed by a policy agent and the agent configures/controls a device in order to enforce the desired policy. Policy enforcement often involves configuring a device to behave in a specific way and thereafter simply letting the device operate. However, policies may be more complex and may require dynamic control of a device. Policy agents operate on local devices (devices running an ARE in which the policy agent is executing) or remote devices (devices which cannot run an ARE for agents to execute in).

Figure 9:
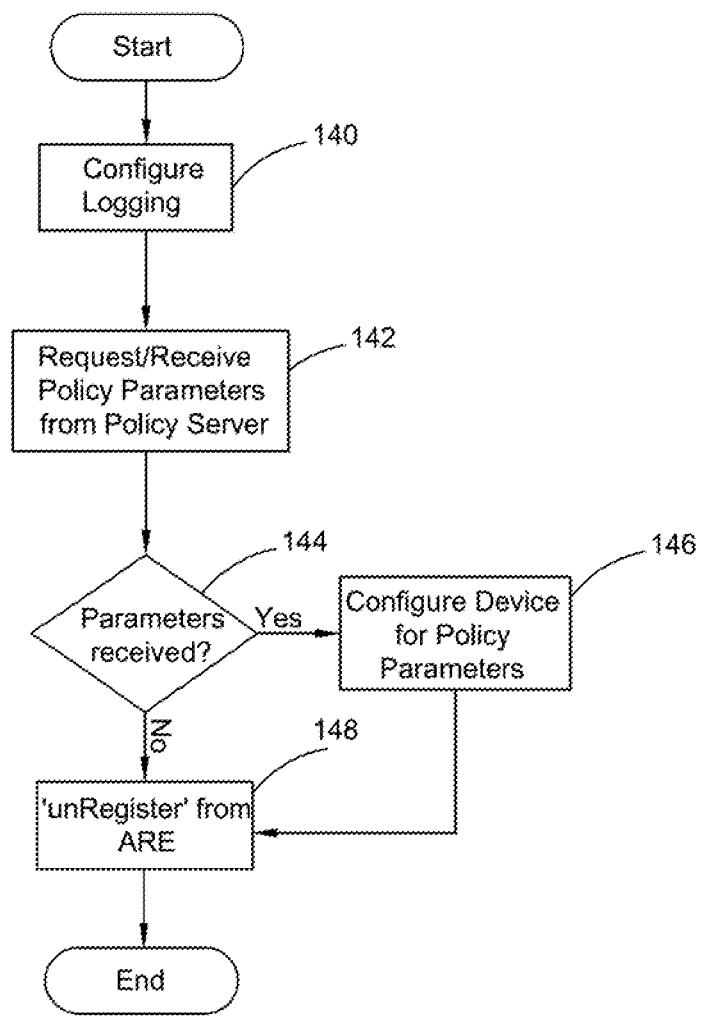
FIG. 9 shows a flow chart of the lifecycle of a simple policy agent.

FIG. 9 shows a lifecycle of a simple policy agent, which configures a device and thereafter lets the device run.

Referring to FIG. 9, at 140 a configure logging process is performed. At 142 the policy agent requests or receives policy parameters from a policy server. Thereafter at 144 a determination is made as to whether the parameters have been received. At 146 if the parameters have been received then the device is configured to operate in accordance with the policy parameters. If no policy parameters are received or after step 146 has been performed, then at step 148 the policy agent unregisters from the ARE.

Figure 10:
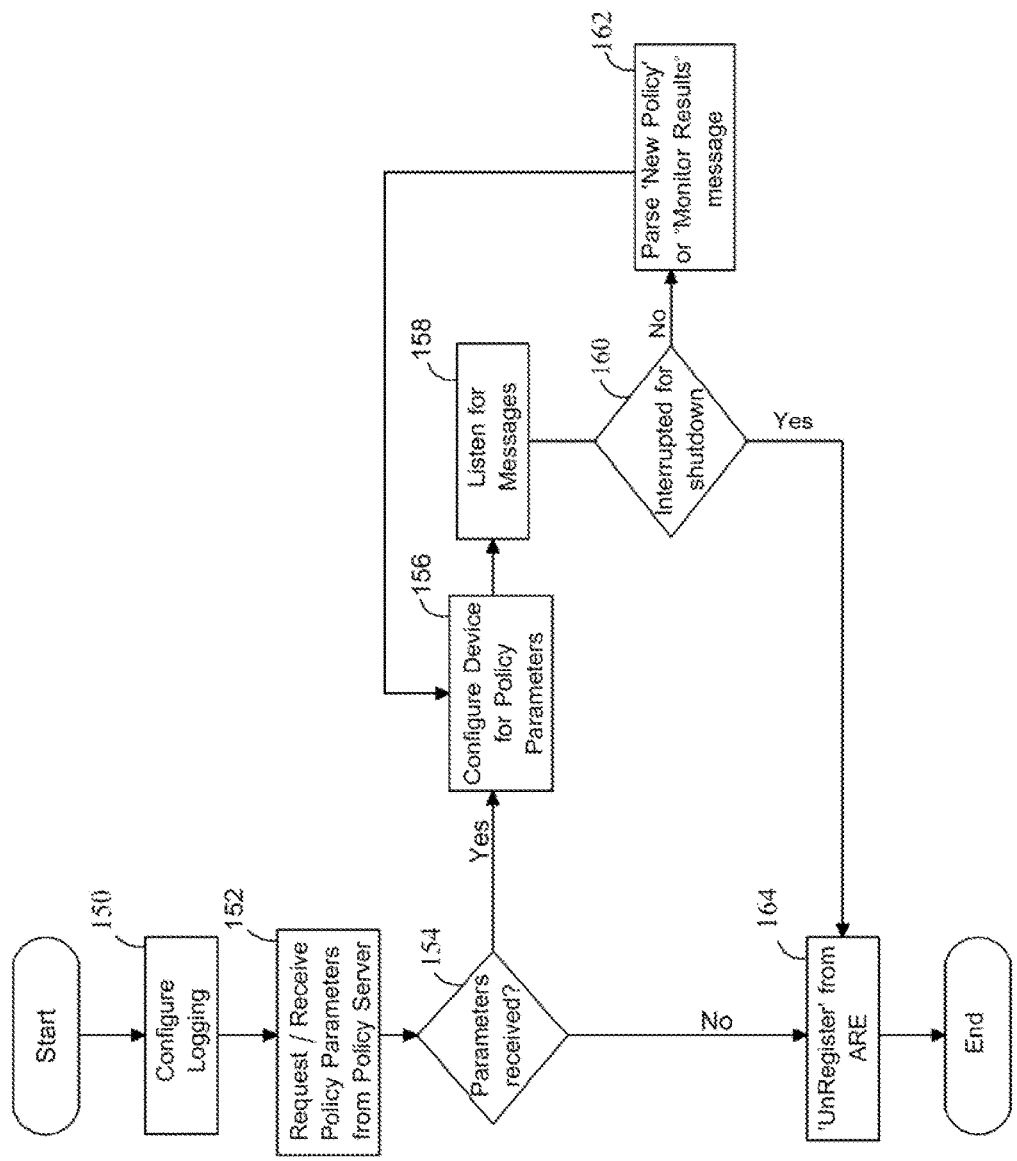
FIG. 10 shows a flowchart of the lifecycle of the more complex policy agent.

FIG. 10 shows a flowchart of a more complex policy agent which works in conjunction with monitoring agents (see below) and other policy agents. This type of policy agent continuously monitors for feedback from monitoring agents and adjusts the policy enforcement settings for a device based on such feedback. Referring: to FIG. 10, at 150 a configure logging process is performed. At 152 the agent requests/receives policy parameters from a policy server. At 154 a determination is made as to whether the policy parameters have been received. If the parameters have been received then at 156 the agent configures the device to operate in accordance with the policy parameters. Thereafter, at 158 the agent listens for messages from a monitoring agent and at 160 a received message is parsed to check if it is an agent shutdown message. If it is a shutdown message then at 164 the agent is unregistered from the ARE. If the message is not a shutdown message then it may be a new policy or "monitor results" message which is parsed at 162 and step 156 comprising configuring the device in accordance with the new policy parameters is performed.

Thus, the complex policy agent goes beyond configuring a device and letting it run and adds a level of dynamic control at the policy enforcement point. The policy agent code itself can become part of the operating policy, shifting between specified policy enforcement settings based on the observed dynamics of a network as reported by associated monitoring agents.

Monitoring Agents

The system 10 further includes monitoring agents to monitor various aspects of the devices in the network. Monitoring agents are able to monitor local devices (i.e. devices running an ARE in which the monitoring agent is executing) or remote devices (i.e. devices which are not able to run an ARE). Each monitoring agent has monitoring policy which determines the operation or set of operations it should perform to monitor the device, and a set of thresholds, within which the monitoring results should fall. When monitoring results are found to lie outside the specified threshold range, the monitoring agents report the event to the system 10. Complex monitoring agents may be written to combine monitored values in a variety of ways using threshold ranges, time periods, rates of change, etc. A hierarchy of monitoring agents can also be used in order to monitor inter-dependent devices, or a sequence/path of devices.

Figure 11:
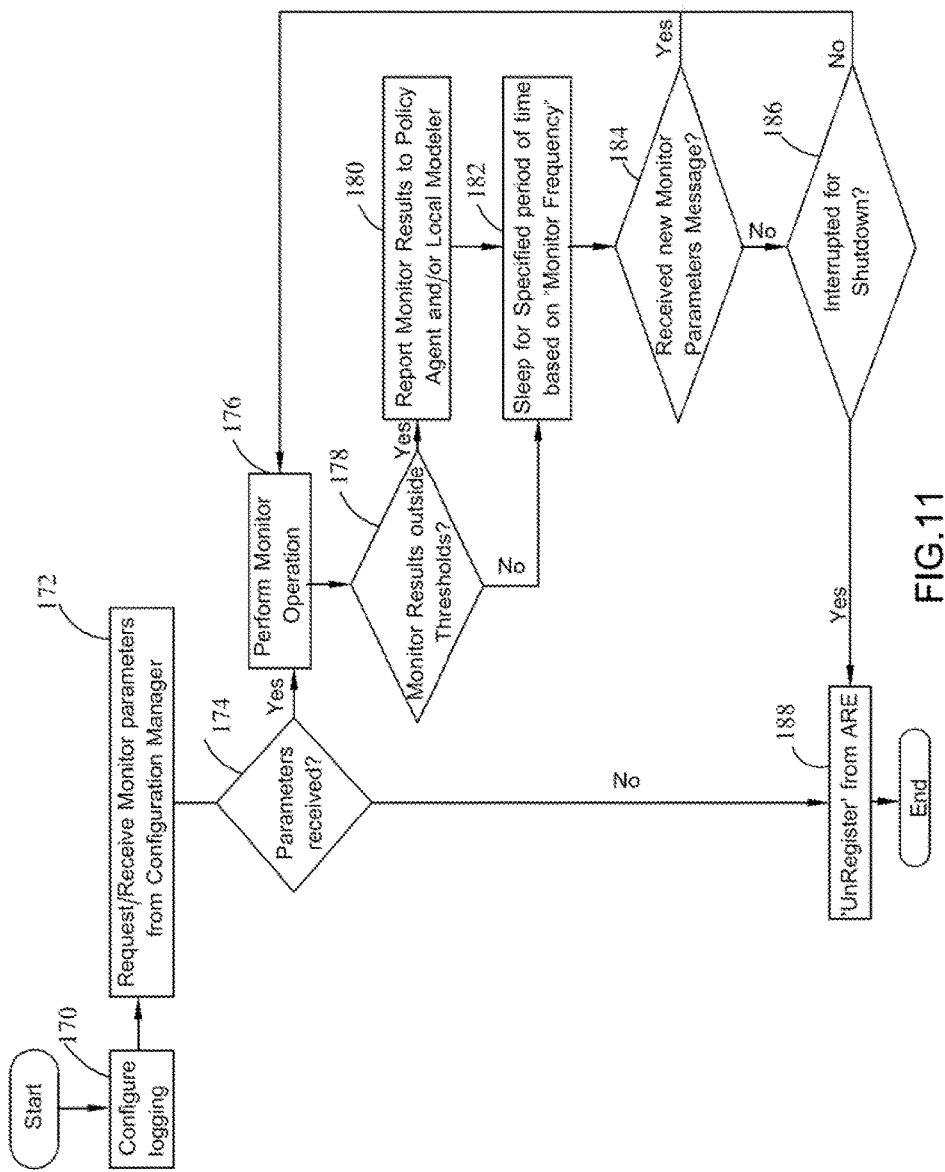
FIG. 11 shows a flow chart of the lifecycle of a monitoring agent.

A typical monitoring agent has a lifecycle with a flow of execution similar to that shown in FIG. 11. Referring to FIG. 11, at 170 a configure logging process is performed. At 172, the monitoring agent requests/receives monitoring parameters from a configuration manager. At 174 a determination is made as to whether or not the monitoring parameters have been received. If the parameters have been received then at 176 the monitoring agent performs the monitoring operation. Thereafter, at 178 a determination is made as to whether the monitoring results lie outside a specified threshold. If the results lie outside the threshold then at 180 this is reported to a policy agent and/or CCE⁻ 20 (see below). If the monitored results fall within the specified threshold then at 182 the monitoring agent sleeps or lies dormant for a specified time (based on a monitoring frequency) after which, at 184 a check is performed to see if new monitoring parameters have been received in the form of a new message. Depending on the results of the check, step 176 may be performed again. At 186 a determination is made as to whether the new message is a message to shutdown the monitoring agent. If the message is a shutdown message then at 188 the monitoring agent unregisters from the ARE.

Detailed Description of Device Adapter Interface 12.2

Each device adapter 12.2 defines a boundary that separates generic system calls from device specific functional calls made upon a particular device(s)/application(s). Both the policy agents and the monitoring agents may make calls to a device adapter 12.2 provided that the functionality of the command and control and monitoring feature sets do not overlap. Each device adapter 12.2 has two types of API calls for the command and control features. Both generic Traffic Engineering (TE) and Application Engineering (AE) calls are used to control devices and applications within the system 10. Each device adapter 12.2 includes device specific drivers which are loadable and unloadable at runtime.

In use, the device adapters "Ping" a device and maintain an open communications channel with the device to make sure a connection with the device does not time out. Monitoring agents are used to achieve this.

Appropriate classes or components needed in order to implement a policy-configuration described within a policy are loaded into each device adapter 12.2 at runtime. Each device adapter 12.2 has a command that signals to the device the device adapter is ready to initiate a device command sequence and a command used to signal to the device the device adapter has finished a device command sequence.

At any point in a communication between a device adapter 12.2 and a device to be managed, an agent may restart and reload class or library drivers to passivate, then reactivate, the connection between the device adapter and the device. In response to an agent request to reactivate the connection, the device adapter 12.2 internally calls a process which passivates communication between the device adapter and the device and process which resets the device adapter.

An agent may query the device that is being managed by a device adapter 12.2 to obtain the current device state depending on what the lag time is between requesting the information from the device and actually receiving it. The agent requesting the information will get different degrees of information back depending on the device information calling level requested. The calls made between each device adapter and the device being managed are preferably secure calls.

Each device adapter 12.2 includes a device adapter toolkit comprising a Command and Control API interface and reference implementations of a Hyper Text Transfer Protocol (HTTP), Simple Network Management Protocol (SNMP), Secure Shell (SSH), and a plain-text device adapter. The device adapter toolkit provides a general interface for management functions used to control host devices.

According to one embodiment of the invention, monitoring agent API calls are designed to setup feedback loops between a monitoring agent and a device or application which facilitates monitoring compliance with policy within the system 10.

The monitoring agent API assumes there will be some lowest common denominator of communication used for each type of device monitored, be it hardware or software. An example would be to use the SNMP protocol for hardware/software devices. Alternatively, a software solution in which an SNMP library is compiled into the application may be used.

There are four types of monitoring within the system 10. These are active (push), active (pull), passive (pull), and passive proxy monitoring.

With active (push) monitoring a device or application would actively broadcast or send information regarding its state to other system 10 components. In one embodiment of the invention, a call is made to a device to startup an application loaded therein which would begin the broadcast which is received and understood by a monitoring agent. Thus, there is an active agent running on the device sending information out in a controlled and timely manner.

With active (pull) monitoring, the agent itself is not passivated and continues to make request/response types of communication between the device adapter and the device/application to be monitored.

With passive (pull), the monitoring agent listens for SNMP traps from a particular device(s). The monitoring agent does not actively setup a feedback loop.

With passive-proxy monitoring, a monitoring agent acts through non-direct means to garner information about the device and its statistics by interrogating neighboring devices.

Figure 12:
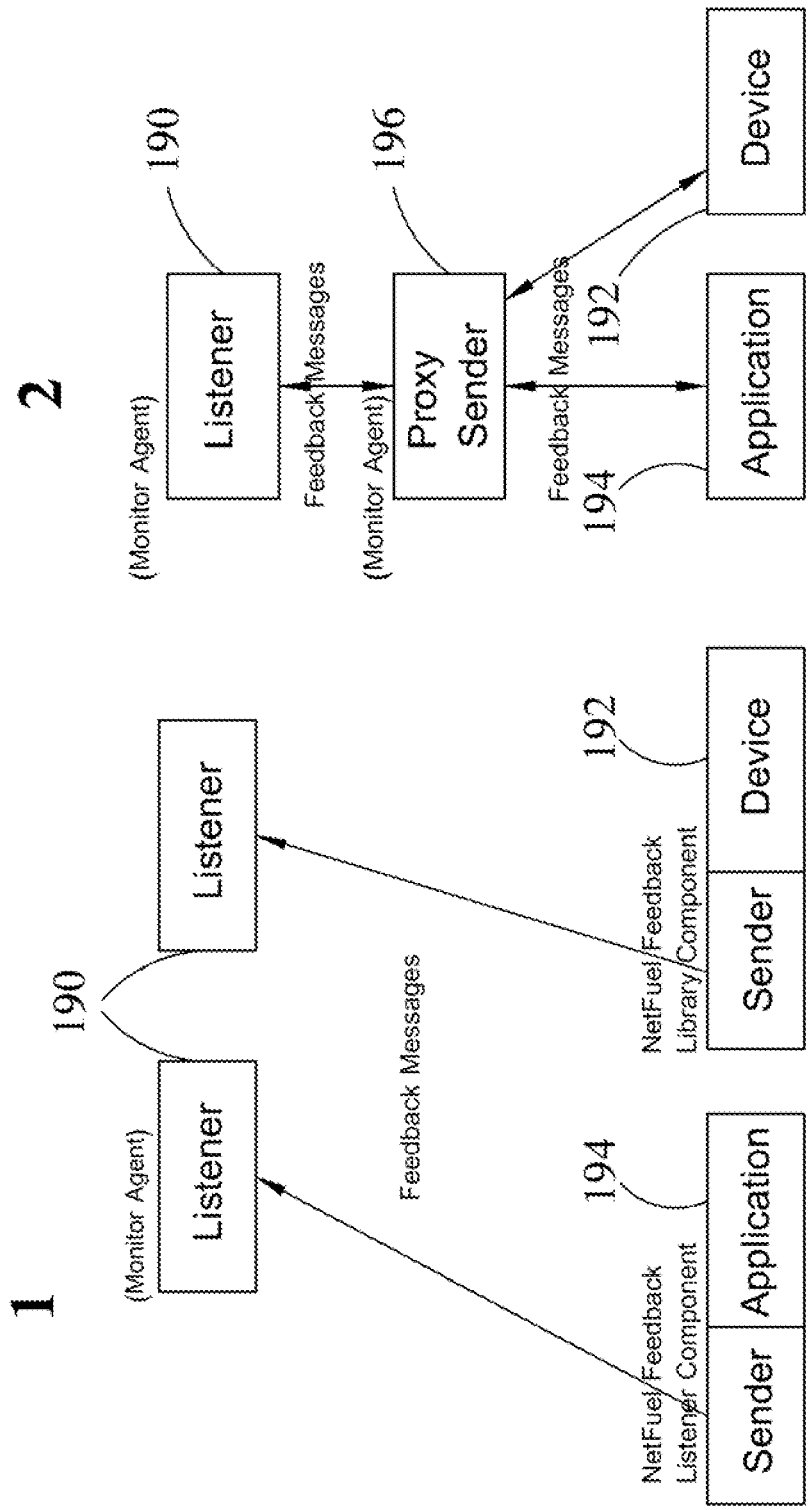
FIG. 12A shows a flow chart of a feedback loop setup by a monitoring agent.
FIG. 12B shows a flow chart of another embodiment of a feedback loop setup by a monitoring agent.

Each monitoring agent connection has two or more parties involved in each feedback loop between a device 192 and application 194 as can be seen from FIG. 12 A. The monitoring agents are referred to as listeners 190 and the device 192/application 194 sending the feedback information is referred to as a sender. There can be more than one listener listening to a sender's transmission i.e. there is a many-to-one relationship between the listener and a sender.

Each monitoring agent creates the feedback loop and as already described has the ability to alert the local modelers to monitored responses. These responses are called policy events and are used to detect any aberrant behavior based on operational ranges specified by the policy. Each local modeler has the ability to take immediate corrective action.

Each device within the system 10 accommodates a minimal set of feedback API's. Devices not able to accommodate this set can be proxied by the device adapter (Listener) into a request/response type of arrangement. This implies there is at least some means of querying the device to be monitored. An example is a device that has a simple web server request/response interface built into it. In rare instances, a device may not be capable of any direct response. If this should arise, the measurement may be inferred through indirect measurement by a proxied device. Sampled feedback API calls include createListener( ); createSender( ); startListener( ); startSender( ); stopSender( ); resetListener( ); and resetSender( ), all of which are methods in Java according to one embodiment of the invention.

According to one embodiment of the invention, in setting up a feedback loop between the device adapter and a device/application, the monitoring agent assumes the device has an active agent running upon it which sends out information to its associated local modeler. According to another embodiment, it is assumed that the device adapter has the capacity to talk to the device in question using the request/response metaphor to glean information from the monitored device. This information is then intercepted and sent to the relevant local modeler. According to yet another embodiment, where there are no active senders (code) on the device/application side, information is inferred by looking at various devices that have active and request/response capabilities around the device to be monitored. By looking at information going into and out of devices that surround the device that is being monitored, information about said device may be inferred. This embodiment is shown in FIG. 12B of the drawings. Referring to FIG. 12B, the various devices around the device to be monitored function as a proxy sender 196, which provides feedback messages to a listener/monitoring agent 190. The feedback is based on communication between an application 194 and a device 192.

The protocol used to setup the feedback loop is dependent on the device adapter 12.2 and the method used by the device adapter 12.2 to communicate with the device/application. The monitoring agent assumes the communication between the device adapter 12.2 and device is secure and private.

A monitoring agent may monitor more than one feature on a device. The monitoring agent may then aggregate a device's polling attributes together into one larger call.

In some embodiments, the monitoring agents comprise two separate agents running sending information between each other or it may be physically the same monitoring agent acting as both sender/Listener.

Messaging Service

The system 10 further includes a messaging service which defines a message bus subsystem which facilitates secure communication between the various system 10 components. The message bus provides for two types of messaging models, publish-and-subscribe and point-to-point queuing, each of which defines a messaging domain.

In the simplest sense, publish-and-subscribe is intended for one-to-many broadcast of messages, while point-to-point is intended for one-to-one delivery of messages.

Publish-and-Subscribe

In a publish-and-subscribe model, one publisher can send a message to many subscribers through a virtual channel called a topic. A topic may be regarded as a mini-message broker that gathers and distributes messages addressed to it. By relying on the topic as an intermediary, message publishers are kept independent of subscribers and vice-versa. A topic automatically adapts as both publishers and subscribers come and go. According to one embodiment of the invention, publishers and subscribers are active when the Java objects that represent them exist. Subscribers are the components which are subscribed to receive messages in a topic. Any messages addressed to a topic are delivered to all the Topic's subscribers. The publish-and-subscribe messaging model defines a "push-based" model, where messages are automatically broadcast to subscribers without them having to request or poll the topic for new messages. In the publish-and-subscribe messaging model the publisher sending the message is not dependent on the subscribers receiving the messages. Optionally, the components that use this model can establish durable subscriptions that allow components to disconnect and later reconnect and collect messages that were published while they were disconnected.

Point-to-Point

In a point-to-point messaging model components are allowed to send and receive messages synchronously as well as asynchronously via virtual channels known as queues. A queue may have multiple receivers. However, only one receiver may consume each message.

Anatomy of a Message

Each message has two parts comprising: the message data itself, called the payload or message body, and the message headers and properties.

Messages types are defined by the payload they carry. The payload itself may be very structured, as with the Stream- Message and MapMessage objects, or fairly unstructured, as with TextMessages, ObjectMessages, and ByteMessage types (see below). Messages can carry important data or simply serve as notification of events in the system 10.

Message headers provide metadata about messages describing who or what created the message, when it was created, how long the data is valid etc. The header also contains routing information that describes the destination of the message (topic or queue), and how a message should be acknowledged.

Each message has a set of standard headers. According to one embodiment, a message header may contain the following fields:

| Header Fields | Set By |
|---|---|
| Destination | Send Method |
| DeliveryMode | Send Method |
| Expiration | Send Method |
| Priority | Send Method |
| MessageID | Send Method |
| Timestamp | Send Method |
| CorrelationID | Component |
| ReplyTo | Component |
| Type | Component |
| Redelivered | Component |

In addition to headers, messages can carry properties that can be defined and set by a message client. Message clients can choose to receive messages based on the value of certain headers and properties, using a special filtering mechanism called a Message Selector (see below).

A message selector allows a component to specify, by message header, the messages it is to receive. Only messages whose headers and properties match the selector are delivered.

Message selectors cannot reference message body values. A message selector matches a message when the selector evaluates to true when the message's header field and property values are substituted for their corresponding identifiers in the selector.

Message Bus Structure

The message bus provides a consistent, secured, and stateful/stateless messaging capabilities to the various services and components within the system 10. The message bus provides a mechanism that allows messages to be queued between components (State-fullness) and provides a classification mechanism so to allocate priority levels for specific messages. If a component is restarted, the component can request previous messages, so as to get a history and be in synchronization with the rest of the system 10.

The message bus supports one-way messaging such as multicast and broadcasts at the socket/port level, in addition to the publish-and-subscribe messaging model.

According to one embodiment of the invention, the message bus listens on specific ports for User Datagram Protocol (UDP), Transmission Control Protocol (TCP/IP), and Internet Inter-ORB Protocol (IIOP) traffic.

The message bus implements a client library that other components compile with to communicate with the publish-and-subscribe or one-way messaging models.

Each message within the message bus has a unique ID, derived in part from the Media Access Control (MAC) address of a network card used by a message bus server.

According to one embodiment of the invention, a message on the message bus has its payload encrypted. The header within the Message Bus message then specifies whether a payload is encrypted or not. To further increase security, the message is sent on multiple ports or channels which are randomly changed.

The header within a message on the message bus contains information regarding a message digest (MD5). The digest is used to verify a message has not been modified during transmission.

The message bus saves its current message state a data storage. This data storage provides persistence and fault-tolerance to the messaging system.

The message bus groups messages together into specific groups (topics).

According to one embodiment of the invention, there is a single root for the message bus which defines a virtual root used to the message bus hierarchy. Each topic then branches off this virtual root.

Message groups (Topics) within the message bus define a hierarchical tree. Topics then may have other topics underneath them as child nodes in the tree.

Message Types

The number of message types that can be defined for use with system 10 are limitless. However, a few of the message types used in embodiments of system 10 are described below:

Policy Event messages are used to communicate changes of state within the system 10. This type of message is used to transport policies throughout the system 10. The Policy Event messages carry within them all the information needed to apply/run a policy on an agent. Policy Event messages have state and are stored and forwarded on to destinations. Policy Event messages assume the message bus guarantees delivery of the message. Policy Event messages have a unique identifier in the system so that the system can be sure that the Policy Event messages sent have not been tampered with. According to one embodiment of the invention, this identifier could be in the form of a digital signature. Policy Event messages are sent in a secured (SSL) manner on message bus according to one embodiment of the invention.

Security Policy Event messages are a subset of the Policy Event message type. This message type deals with security related topics such as authorization/authentication issues between various system components.

Logging Policy Event messages define the logging characteristics of the system 10. Logging Policy Event messages can be used for debugging the system 10. The Logging Policy Event messages have various warning and error levels defined.

Auditing Policy Event messages define various audit control messages available to the different system 10 components and device/applications managed by the system 10.

Service Management Event messages are used to control various system 10 services.

Device/Application Management messages are used to control device(s)/application(s) managed by the system 10. The way Management messages are sent is dependent on the device or application to which a device adapter 12.2 is trying to communicate with. Management messages may or may not use the message bus to convey control information to the device or application being managed. Management messages assume communication between a device adapter 12.2 and the device/application being managed is guaranteed.

Feedback messages are used to provide real-time/near real-time feedback information on a device/application that is being monitored by the system 10.

Generic messages are used to convey information outside the normal Message Bus boundaries. These messages are used to communicate with outside systems that require special means (gateways) to communicate between system 10 and foreign systems. Generic messages have a guaranteed delivery but have no time dependency attached to them.

Message Bus Behavior

A client object using the message bus client library is able to connect to a publish/subscribe channel. The client library provides event handles or thread safe callbacks to the calling program.

The message bus server keeps a log of all transactions/operations that occur regarding message routing within the message bus.

The message bus provides a mechanism that allows a system administrator to direct and define the logging/auditing levels to various components within the system 10 in real-time.

The message bus server derives a time stamp from a time service. All messages created within the system 10 derive their time stamp either directly or indirectly from a time server running the time service.

The message bus includes an error reporting mechanism which reports specific error conditions relating to commands and operations carried out by both the client/server side of any message bus operation. Notification of an error condition is provided to the clients and servers.

Errors are logged to a Logging Service, which allows the system administrator to perform a system message audit to determine where the error originally occurred.

Client Plug-in

The system 10 includes a Client Plug-in which reside as a Dynamic Link Library (DLL) or in component(s), which install locally on a client's browser.

The client Plug-in is able to retrieve specific information from a digital certificate that uniquely identifies (authenticates) a user using the browser connecting a system 10 network.

The Client Plug-in is activated when a web server sends a Hypertext Markup Language (HTML) page back to the browser with a special Multipurpose Internet Mail Extensions (MIME) type embedded in an HTML page calling on the plug-in to start on the client's browser.

Users are able to administer a site list using commands such as add, delete, and modify. This allows the user to either add new sites or change Uniform Resource Locator (URL) addresses when necessary.

In one embodiment of the invention, the Client Plug-in will be activated only if there is a secure SSL connection between the user's browser and a host server identified within the site list.

The state information for mapping a certificate to a site (URL) is kept in a secure (encrypted) file locally or is encrypted and stored within the client operating system registry for the browsers plug-in.

Client Plug-in Behavior

If a user is not connected to a system 10 controlled network, the client plug-in will not be activated.

When visiting specific sites within the plug-in's site map list, the plug-in attaches a serial number, from a user's digital certificate residing on the browser, to the front of an HTTP stream. This is used as a tag or (cookie) to uniquely identify each user within the system 10 controlled network.

Figure 13:
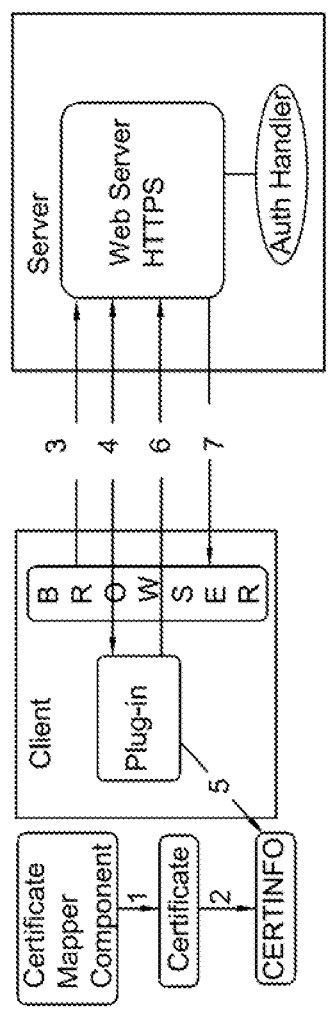
FIG. 13 shows a client browser plug in activation/request sequence according to one embodiment of the invention.

The client browser plug-in activation/request sequence according to one embodiment of the invention will now be described with reference to FIG. 13 of the drawings. Referring to FIG. 13 of the drawings, at (3) the client browser requests a web page from the server. At (4) if the web page requested is a secure page, the server sends a HTML page with MIME type EMBED to start the Client Plug-in on the client browser. The Client Plug-in then verifies if the connection is over SSL. At (6) the Client Plug-in appends the data read from the certificate (Serial Number) to the HTTP stream and sends the request to the web server (The Netscape function NPN_PostURL method or a cookie may be used to send this information). At (1) A certificate mapper component reads the certificate mapped by the user. At (2) the certificate information required for authentication is extracted and stored in a predefined location. At (3) the client browser makes a request to a secure page on the server. At (4) the server returns an HTML page with the plug-in EMBED to start the plug-in on the client browser. At (5) the plug-in gets the certificate information from the client's machine. At (6) the certificate information and/or data (using PostURL to the server) is returned. Finally, at (7) the server validates the certificate and returns the requested page.

Policy Distribution

Policy is distributed in the system 10 along a chain defined by the global, regional and the local modelers. The global modeler breaks up and enforces policies upon subordinate modelers. This is done to add scalability and robustness and to reduce decision-making time.

Local modelers typically exist within an ARE. This is done to reduce the footprint of an ARE when memory is in short supply, such as inside a network appliance.

Figure 14:
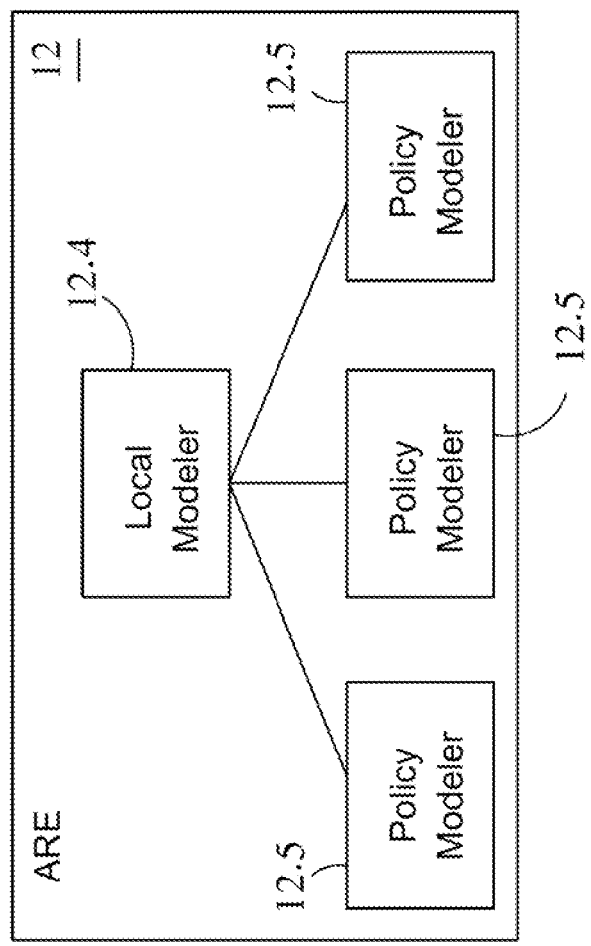
FIG. 14 shows a block diagram of an ARE comprising a local modeler and three policy modelers.

FIG. 14 shows a bock diagram of an ARE 12 comprising a local modeler 12.4 which enforces policy on policy modelers 12.5 which define the lowest level modeler. The policy modelers 12.5 reside inside an agent and enforces simply policies.

The modelers apply a policy calculus to decompose policies with simple policies.

Hierarchy Between Modelers

Figure 15:
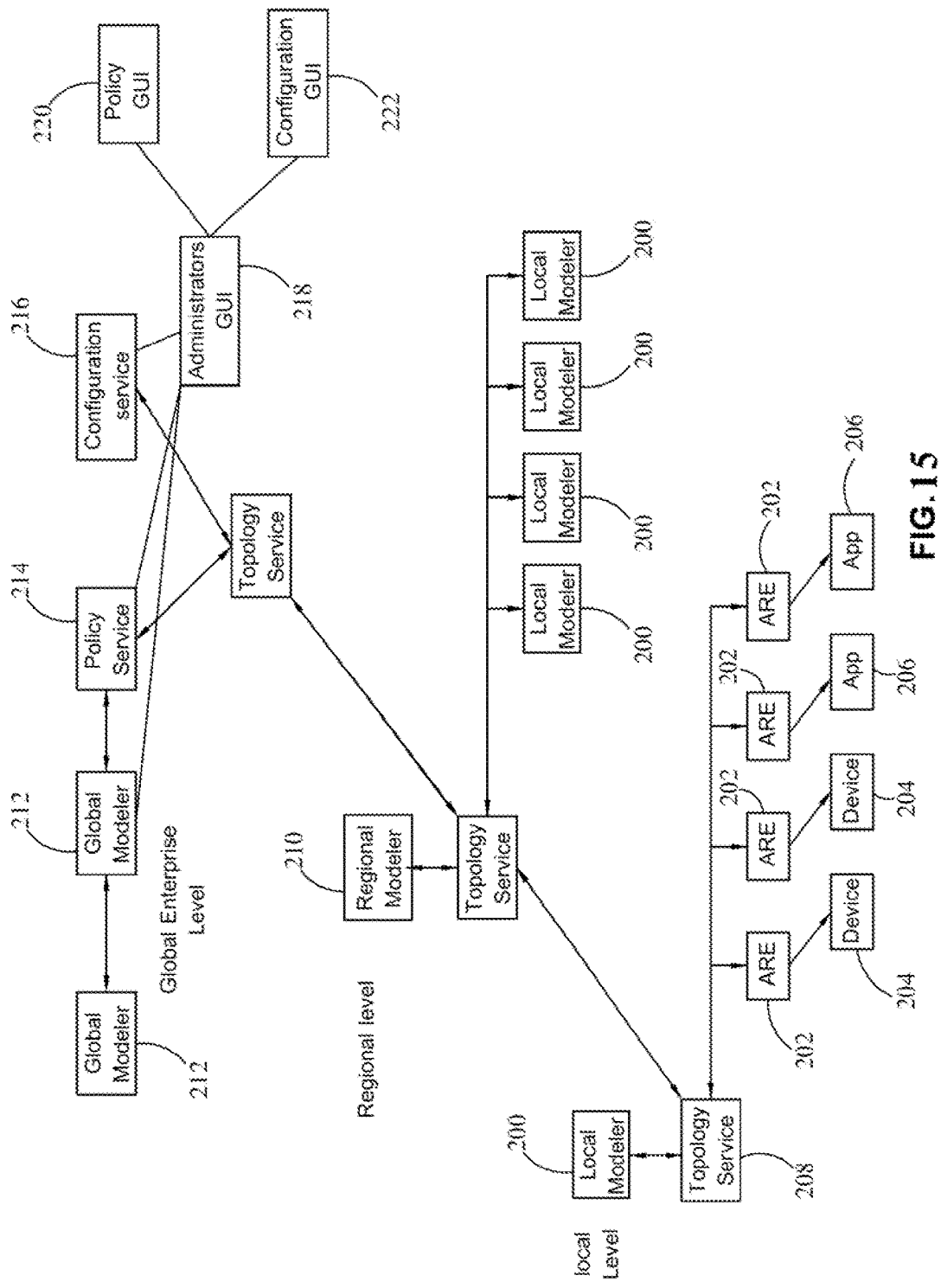
FIG. 15 shows the hierarchy of the various modelers within the system.

FIG. 15 shows the hierarchy of the various modelers within the system 10 according to one embodiment of the invention. Referring to FIG. 15, the first level is the local level which is defined by local modelers 200, such as local modeler 12.4 in FIG. 14. The local modeler 200 comprises a number of AREs 202 which control devices 204 or applications 206. Each ARE communicates to a topology service 208. One level above the local level is a regional level which is defined by a regional modeler 210 which controls a number of local modelers 200. The highest level in the system 10 is the global or enterprise level which defines a global modeler 212. The global modeler 212 communicates with a policy service 214, the topology service 208, and a configuration service 216 to coordinate overall policy interaction and control. An administrators GUI 218 facilitates input to the global modeler 212. The administrators GUI 218 comprises a policy GUI 220 whereby new policy or policy changes may be input into the system 10. The administrators GUI 216 further comprises a configuration GUI 222 whereby configuration changes to the system 10 may be input.

Figure 16:
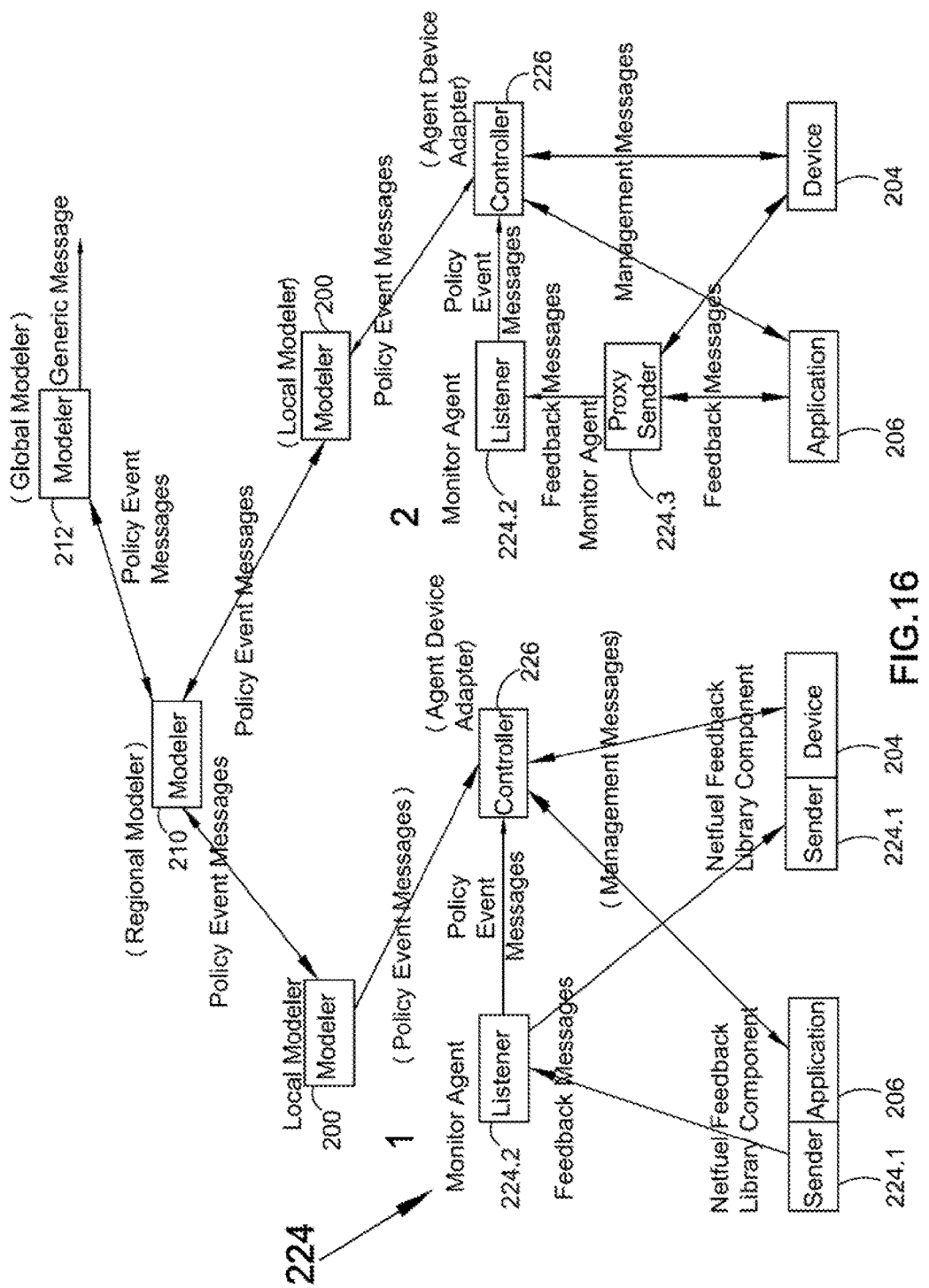
FIG. 16 shows the configuration of the modelers of FIG. 15 in greater detail.

FIG. 16 shows the configuration of the various modelers shown in FIG. 15 in greater detail. Referring to FIG. 16, a monitoring agent 224 is started as described earlier. In one embodiment the monitoring agent 224 has a sender component 224.1 which sends information about the operation and status of application 206 and device 204, respectively, to a listener component 2242. Such information is in the form of feedback messages. In a second embodiment, information about an application 206 or device 204 is obtained indirectly using a proxy sender 220.3/listener 224.1 variation of a monitoring agent as previously described. As is shown in FIG. 16, the listeners 220.1 send policy event messages to a controller 226. Each of the controllers 226 is defined by a policy agent/device adapter combination. The controllers 222 are able to send management messages to the applications 206 and devices 204 in order to exert control over these devices and applications. Each of the controllers 226 communicate with local modelers 200 by sending and receiving policy event messages. Communication between the local modelers 200 and a regional modeler 210 takes place via an exchange of policy event messages. Likewise, policy event messages are exchanged between the regional modeler 210 and a global modeler 212. The global modeler is able to send generic system messages to a system administrator.

Thus, according to the embodiments described above, the local modelers form part of the Policy Decision Point (PDP) for agents and is concerned with monitoring events and notifying register agents when to apply appropriate behavior based modifications to policy currently running upon the agents.

Figure 17A:
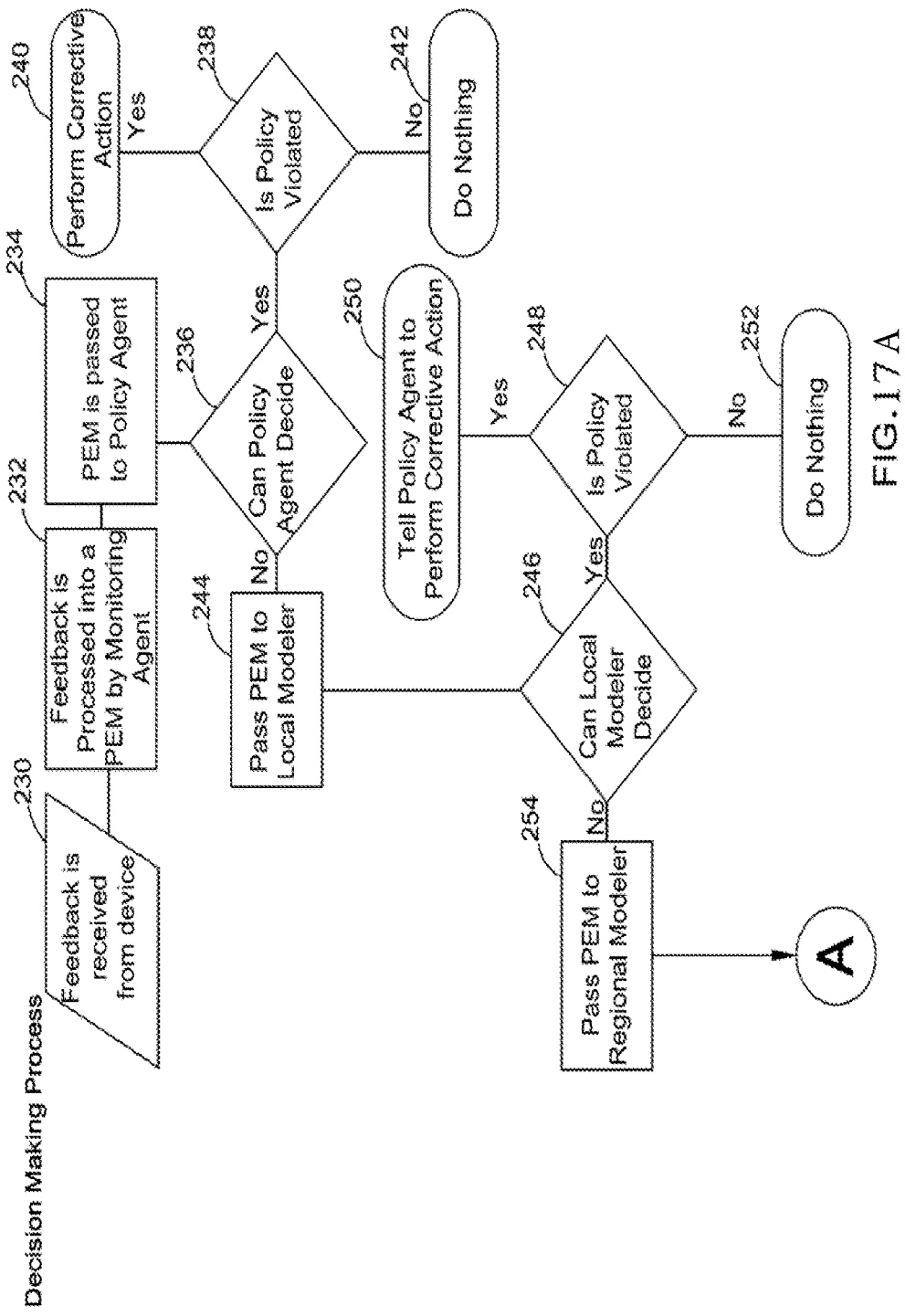
FIGS. 17A and 17B show a flow chart of the decision-making process used by the various modelers.
Figure 17B:
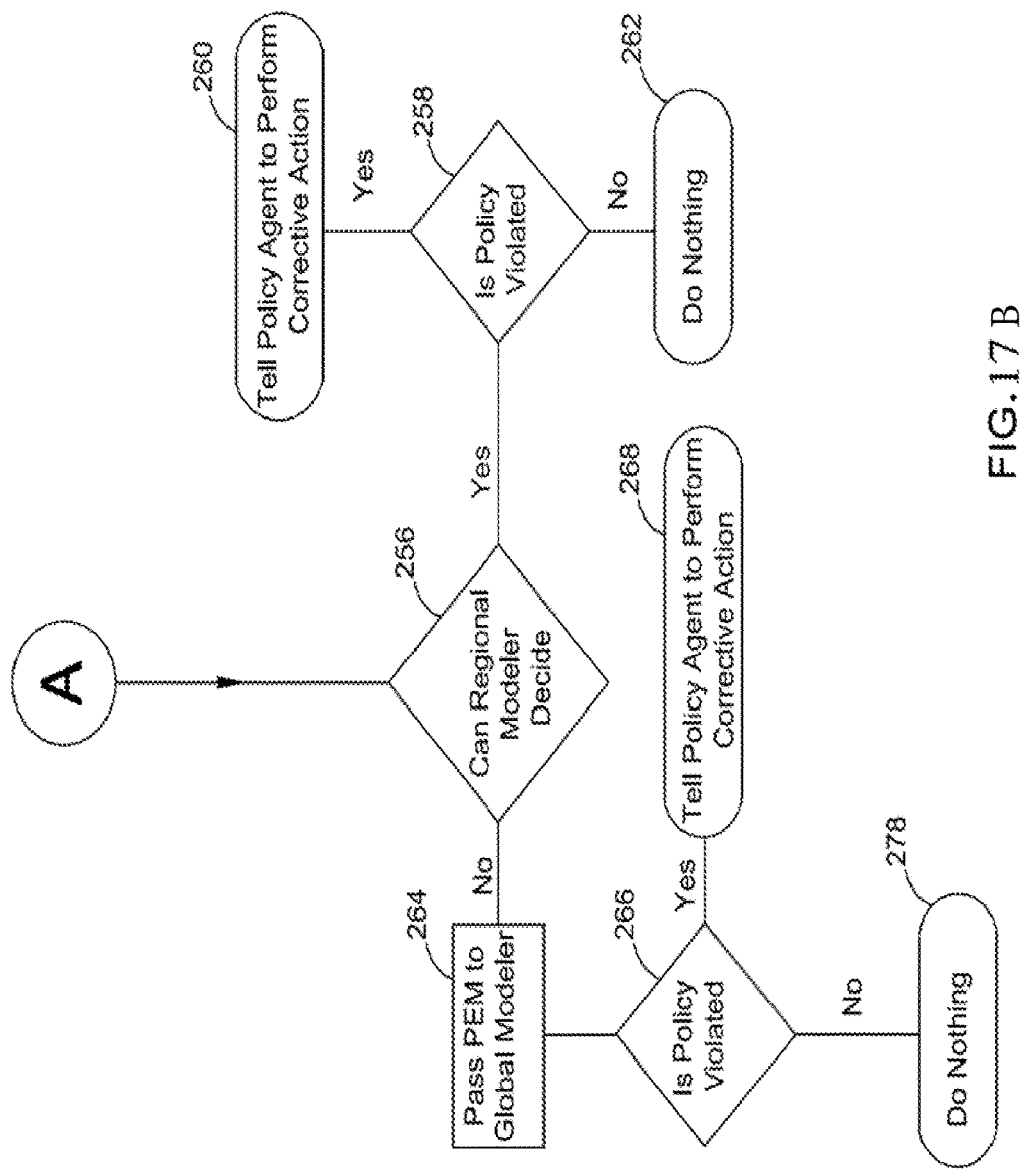

FIG. 17 illustrates the decision making process used by the modelers, according to one aspect of the invention. Referring to FIG. 17 at 230 feedback is received from a device or application being monitored. At 232 the feedback is processed into a Policy Event Message (PEM) by a monitoring agent. At 234 the PEM is passed to a policy agent which decides at 236 whether it is endowed with the necessary policy in order to effect the necessary corrective action based on the PEM. If the agent decides that it has the necessary policy at 238 a determination is made as to whether the policy has been violated. If the policy has been violated, at 240 corrective action is performed otherwise, at 242 the agent does nothing. If it is determined that the agent lacks the necessary policy in order to take action, at 244 the PEM is passed to a local modeler. At 246 the local modeler makes a decision as to whether it is able to handle the PEM, by itself or whether it needs further policy. If it is decided that the modeler is able to handle the PEM, at 248 a determination is made as to whether the policy has been violated. If it is determined that a policy violation has occurred, at 250 an instruction is sent to the policy agent to perform corrective action. Alternatively, if policy has not been violated, at 252 the local modeler does nothing. If it is determined that the local modeler lacks the necessary policy to take action, at 254 the PEM is passed to a regional modeler which makes a decision at 256 whether it has the necessary policy in order to take action. If it is decided that the regional modeler has the necessary policy to take action then at 258 a determination is made as to whether the policy has been violated. If the policy has been violated, at 260 the regional modeler sends instructions which are filtered through the local modelers and is eventually received by an appropriate policy agent whereupon the policy agent takes the necessary corrective action. If it is decided that no policy has been violated, at 262 the regional modeler does nothing. If a determination is made that further policy is required by the regional modeler at 264 the PEM is passed to the global modeler. At 266 the global modeler makes a decision as to whether policy has been violated. If policy has been violated, at 268 the global modeler sends instructions to a policy agent, which instructions eventually reach a relevant policy agent by passing firstly through the regional modelers and then secondly through one or more local modelers. The instructions are instructions which tell an agent to perform the necessary corrective action.

The local modelers are responsible for picking up change control messages from either a parent modeler or the topology service. The local modelers monitor or listen on a range of well-known ports defined by a system administrator or a client. If the port assignments are defined by a client, the port assignments need to be made at the global level for all the lower level modelers underneath to work correctly.

Characteristics of Local Modeler Behavior

As described the primary function of the local modelers is to deploy, coordinate, and control compound policy statements over multiple managed devices within the system 10. Compound policy statements are policies that encompass more than one device/resource distributed within the system 10. It coordinates and develops strategies to cope with the various demands the network/application may make.

Each local modelers control state replication of agents which involves replicating the state of each agent or other modelers. This is done in order to make the system 10 fault-tolerant. Each local modeler goes through a selection process to determine its nearest neighbor that it can safely replicate by doing a ping and checking the return round trip values to and from the various local modelers within its functional domain. The modelers with the lowest round trip values are selected for agent replication.

Each local modeler controls only agents that are registered within its operational ARE or that are being proxied by the local ARE in which the local modeler resides.

Each local modeler coordinates policy between the various policy agents deployed upon an ARE. This includes coordinating policy resource sharing between devices and policy enforcement upon managed devices.

Each local modeler listens for feedback messages sent by devices it has been setup to monitor. It can listen to devices and agents on other ARE's.

Each local modeler also listens for change control (notification) messages sent out by the topology service. These messages are sent by the Topology Service to notify ARE's, and specifically agents when a change in their policy or configuration has occurred. The local Modeler listens to these messages through a well know socket port.

If a policy is a complex policy, the local modeler breaks the policy into a set of simpler policies using a policy calculus and applies them to policy agents or subordinate modelers.

Characteristics of Global Modeler Behavior

The global modeler forms a master scheduler/planner/architect for one or more functional domains. It is responsible for analyzing, in real-time, a single functional domain and determining its optimal usage between various components given various global/regional/local policies applied to the system 10. It does this in real-time and manages by sending out commands to the local modelers.

The global modeler has a primary and secondary systems image of the system it is modeling and controlling. The primary systems image represents the current state of a particular functional domain that the global modeler is controlling. The secondary systems image is used for backup purposes and provides a means to test policies on a backup before implementation.

Policy Structure

Policies contain within themselves directives to setup, enforce, and coordinate actions within the network/application they are controlling. Policies know about the participants required to set up a feedback loop and to control and monitor the loop. In effect, policy can be thought of as a coherent set of rules to administer, manage, and control access to network/application resources.

Policies are applied to the topology service. According to one embodiment of the invention, the policy service uses the topology service as a mechanism to link policy and configuration information together for distribution within the system 10.

There are two types of policies within the system 10 viz. simple and compound policies. A simple policy has the following form of an IF Test=True THEN, DO specific ACTION. A simple policy is evaluated in this way; "IF" the condition evaluates to true by testing a variable, "THEN" a specific action (behavior) is applied to a device or application.

A compound policy consists of two or more simple or compound policies grouped together in a statement. A compound policy is evaluated by first evaluating the highest level of containment (the parent compound policy) first, if the outer most condition(s) of the parent compound policy evaluates to true, then the subsequent child policies are evaluated by order of their placement in the compound policy statement array, and by their priority (see below). If the outer most containment compound policy conditions evaluates to false, then no other child evaluations are performed, and the compound policy is evaluated to false.

Policies are prioritized by level of importance. Depending on the priority level associated with a given policy, the policy can have a specific evaluation order.

For example, a policy may be labeled with one of three designations; (1) mandatory, (2) recommended, and (3) don't care. Mandatory policy must always be attempted, recommended policy is attempted if at all possible but are not necessary, and the don't care is self-explanatory.

Policies are linked with configuration information to form a complete policy. A policy that is linked to a specific configuration uses a unique hash key to map from one to the other. The key is used as a reference to link both pieces of information together.

In one embodiment of the invention, policies are chained together to form a policy behavior chain. Multiple policies can be linked together to form behavior chains. A chaining field is defined within a policy, which holds comma delimited policy ID's used to specify which policy should be called next and in what order they are to be executed, for example, PolicyChainField: P12345678, P23456789, P34567890, etc. . . . .

Policies vary in the level of abstraction from business-level expression of QoS of service level agreements (SLA), to the specification of a set of rules that apply to a specific device/application on the network. Higher-level rules are defined for global and regional modelers. These are called domain level policies, and may have late binding variables that are unspecified, or specified by a classification, whereas the device-level rules used at the local modeler level have no late bindings.

Policy abstraction levels can be represented as services. Services are administrative divisions of functionality.

Figure 18:
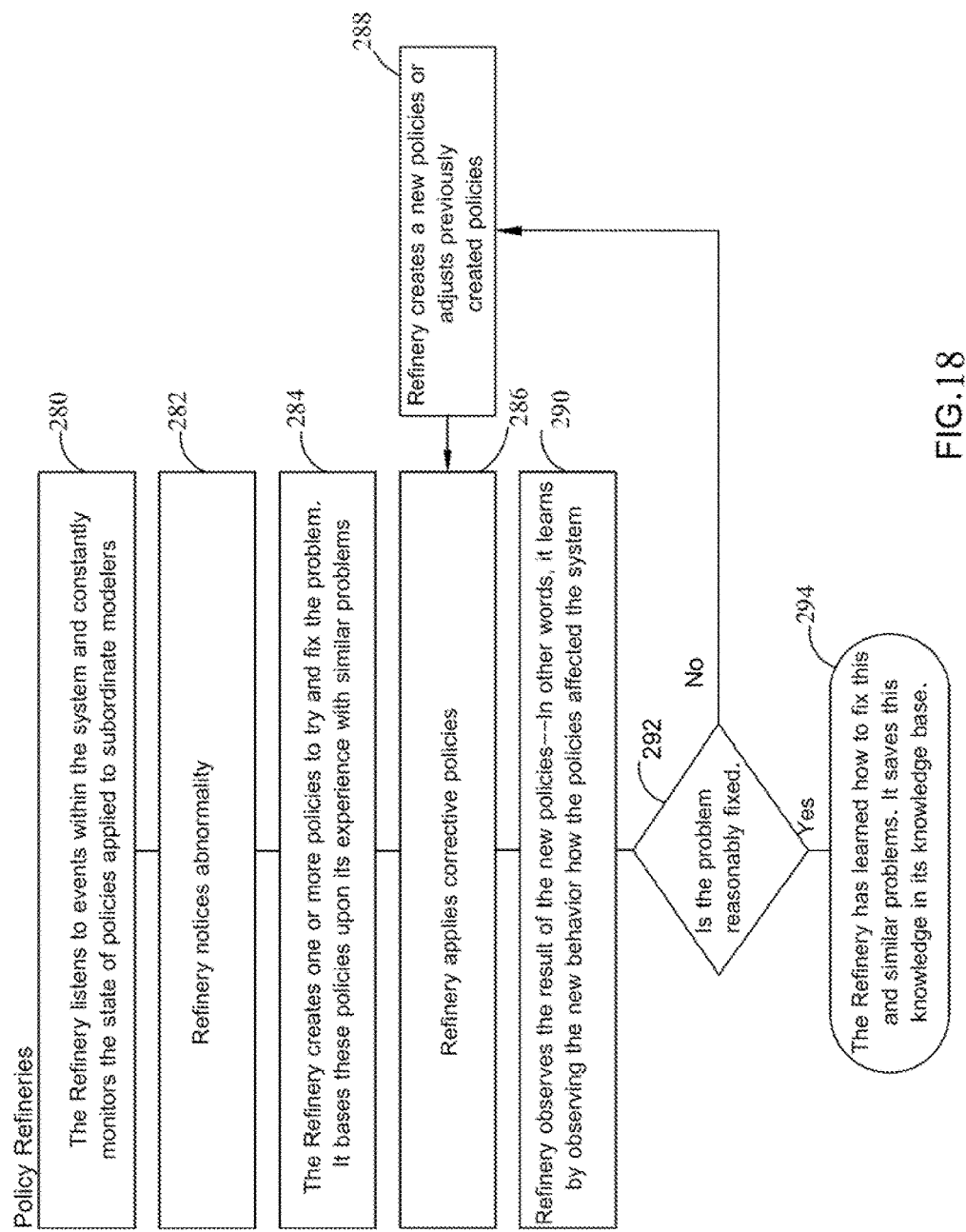
FIG. 18 illustrates the operation of a policy refinery in accordance with one embodiment of the invention.

As described, the global modeler includes a modeler 18.4 which in one embodiment of the invention defines a policy refinery. The operation of the policy refinery will now be explained with reference to FIG. 18. Referring to FIG. 18 at 280 the refinery monitors/listens to events within system 10. At 282 the refinery detects abnormalities in the system. At 284 the refinery creates one or more policies to try and fix the abnormality. It bases these policies upon its experience with similar problems. At 284 the refinery applies these corrective policies and at 290 the refinery observes the results of the corrective policies. The refinery learns by observing the new behavior of the system 10 and specifically the effect of the corrective policies on the system. In one embodiment of the invention, the refinery uses numerical methods to determine appropriate modifications to policy. The numerical methods may include the use of Kohonen Self Organizing maps and/or a Dijkstra Self Stabilization Algorithm. A Kohonen Self Organizing map is a neural network algorithm based on unsupervised learning. In another embodiment, the refinery, uses predictive algorithms to predict the failure of a network device and to determine appropriate corrective policy ahead of the failure. At 292 a determination is made as to whether the problem or abnormality has been remedied. If it is determined that the problem still persists, at 288 the refinery creates further corrective policy or adjusts previously applied corrective policy and step 286 is performed again. If the problem has been fixed then at 294 the refinery updates its knowledge base with information regarding how to fix a similar problem in future.

Services

Services are abstractions of policy or administrative divisions of functionality. Viewed differently, a service is the work performed or offered by a server. As will be appreciated, system 10 may have various services according to different embodiments of the invention. The message service has already been described. Each of the services has one or more associated servers running the service. What follows is a description of services used in one embodiment of the system 10.

Policy Service

The policy service sends policy information to the topology service. The policy service links policy and configuration information together by a hash key generated by the policy service.

An individually managed device can have many policies applied to it at the same time. This refers to the fact that each policy can configure a portion of a devices overall functional capability. Policy can overlap with other policies and the policy service determines when a policy or combinations of policies is invalid.

A new policy is considered invalid if it affects by direct or indirect action other policies already in existence. This can be caused by, for example, two or more policies sharing the same resource; or by implementing a policy that causes an indirect impact by diverting system resources away from existing enforced policies, resulting in over compensation and serious side effects to the system as a whole.

Policies follow a hierarchical distribution chain or tree. This means ARE's that are above it within the tree chain hierarchy can hold policy information which a child node can request.

Policy Deployment Mechanics

Policy Service-to-Topology service: In the policy deployment sequence, policies either new/existing from the policy service are first sent to the to the topology service. The topology service holds a tree that defines a logical management hierarchy for the system 10.

Topology Service-to-ARE: Within the topology service, the policies that are active currently reflect the state of the network as controlled and managed by the system 10 for that particular functional domain. Each ARE after startup/initialization, contacts the topology service to determine which local modeler is assigned to its functional domain. Thereafter the ARE obtains the relevant policies/configurations from the topology service and instantiates appropriate agents to handle the policy or configuration demands. If the ARE is unable to start an agent, it sends a response back to the topology service indicating there was a failure to start the agent on the ARE.

ARE-to-local modeler: When a policy (agent) is instantiated upon an ARE, the ARE registers the policy with the local modeler assigned to its functional domain.

ARE-to-Agent: After connecting to the topology service and determining what policies (agents) are to be started. The ARE goes about instantiating an agent within the ARE as defined by the topology service management tree. Part of instantiating an agent includes notifying the appropriate modeler that a new policy has been applied within the ARE.

Agent (Policy)-to-Device (Direct): The agent (policy) running on the ARE first attempts to issue commands through its device adapter. The first command issued is a status command that shows that the communication channel between the device and the agent's device adapter is working and the device is in a operational state.

Agent-to-Application (Direct): The agent (policy) running on the ARE first attempts to issue a request to the application through its device adapter. The initial request consists of an information status command used to determine if the virtual communications channel is open between the agent (policy) and the application/service through the agent's device adapter.

Agent-to-ARE-to-ARE-to-Agent-to-Device (Proxied): This defines the proxy process that occurs when one agent cannot fulfill a policy agent request on a particular ARE and must seek another ARE to host the request. If the ARE is unable to start the agent, it sends a request back to the topology service requesting another ARE close by to proxy the agent. The topology service sends a request to a neighboring agent to determine if it can host the agent. If the neighboring ARE can, it sends back an acknowledgement to the topology service and the request is then handled on the proxied ARE. Messages sent to the original agent are now all directed to the proxied ARE/Agent. The policy is enforced by the agent and communicated to the actual device through the Device adapter interface.

Agent-to-ARE-to-ARE-to-Agent-to-Application (Proxied): This defines the proxy process that occurs when one agent cannot fulfill a policy agent request on a particular ARE and must seek another ARE to host the request. If the ARE is unable to start the agent, it sends a request back to the topology service requesting another ARE close by to proxy the agent. The topology service sends out a request to a neighboring ARE to determined if it can host the agent. If the proxy ARE can, it sends back an acknowledgment to the topology service and the request is then handled on the proxied ARE. Messages sent to the original agent are now-all directed to the proxied ARE/Agent. The policy is enforced by the agent and communicated to the actual application through its Device adapter.

Local modeler-to-Topology service: The local modeler notifies will notify the topology service when an agent running on an ARE is no longer within SLA compliance of an active policy within the system 10.

Topology Service-to-Policy Service: The topology service communicates with the Policy Service when a policy being administered by an agent is no longer able to stay within an SLA range. The local modeler signals to the topology service that the agent is no longer able to adequately service the policy (SLA) and that a new policy is needed. The topology service signals the policy service that the policy is no longer adequate and that a new policy is needed. At this point the global modeler would then take over and determine the best course of action needed or the policy service would check to see if any policies are chained to the existing failed policy.

Policy rules have an implicit context in which they are executed. For example, the context of a policy rule could be all packets running on an interface or set of interfaces on which the rule is applied. Similarly, a parent rule provides a context to all of its sub-rules. The context of the sub-rules is the restriction of the context of the parent rule to the set of cases that match the parent rule's condition clause.

The relationship between rules and sub-rules is defined as follows: The parent rule's condition clause is a pre-condition for evaluation of all nested rules. If the parent rule's condition clause evaluates to "false", all sub-rules are skipped and their condition clauses are not evaluated. If the parent rule's condition evaluates to "true", the set of sub-rules are executed according to priority. If the parent rule's condition evaluates to "true", the parent rule's set of actions is executed before execution of the sub-rules actions. A default action is one that is to be executed only if none of the more specific sub-rules are executed. A default action is defined as an action that is part of a catchall sub-rule associated with the parent rule. The association linking the default action(s) in this special sub-rule has the lowest priority relative to all other sub-rule associations.

Topology Service

The topology service ties together both the configuration and policy to a specific device. The topology service acts as a central point within the system that defines the overall system control state and what policies and configurations are defined for each controllable device being managed by the system 10.

The topology service notifies ARE's of changes in its structure by sending out a broadcast or multicast message embedded with information about configuration changes. The ARE then alerts an agent that the topology state has changed. The agent then updates itself with new policy to bring itself back into compliance with the topology services system state.

The topology service acts in a passive manner. It does not actively seek out ARE/Agents that are out of synchronization with its network system state. It follows a request/response stateless paradigm similarly used within the HTTP protocol.

Configuration Service

The configuration service stores configurations for each policy used on a managed device within the system 10. The configuration service stores information required to carry out a policy on a particular device. This information is device specific making each configuration unique to each device or class of devices.

An individually managed device can have many configurations applied to it at the same time. This is because each policy(s) can configure a portion of a devices overall functional capability. The specific libraries and classes needed for a particular policy-configuration are stored within the configuration service server. Alternatively, the links to the classes and libraries needed are moved. The configuration service stores hardware/software specific commands that can be used to interact with the device/application that is to be controlled by the system 10. The configuration service will initialize and make known on a well-known port the configuration for ARE's running within the system 10.

Security Service

The system includes a security service to implement security measures. The security service includes an authorization module which defines a checkpoint for incoming requests from sources outside the system 10 which is used to monitor/defend against un-wanted and un-authorized intrusions into the system 10. The authorization module resides on an edge or along the outer perimeter of a network managed by system 10. The authorization module assumes that the transmission of data between the sender (Users Browser) and the receiver (authorization module) uses some form of encryption. As described above, in one embodiment the system 10 uses SSL encryption between the sender and receiver. The authorization module validates user, system and service level requests. The validation and checking of requested actions is performed using an access control list (ACL) along the edge boundary point. The ACL list is used to manage and control the permissions of session related requests within the system 10. Only authorized users within the system 10 have authority to grant ACL rights to system resources. An application request is first identified at the edge of the system 10 before it is allowed to proceed to its destination inside the system 10. The incoming request is scanned for an identifying digital certificate, which is appended or embedded to the incoming request by the sender. The incoming request may, for example, be an HTTP request. The sender is required to attach a digital certificate to the front of each incoming request into the system 10 using an SSL connection. The authorization module parses and strips the certificates off each incoming request and compares it to an in-memory cache within the authorization module. If there is a match within the cache, the request is validated and passed on to its destination and the session window timer is reset. If there is no match within the cache, a query is then made from the Authorization Module to a data store to determine if the certificate is valid. If the certificate is found in the data store, a session object is created along with the ACL list. A session window timeout timer is then started and the request is allowed into system 10. If the certificate cannot be validated or found within the datastore or there is no certificate to the request, the request is considered invalid and ignored. If a significant number of requests that are deemed invalid are from the same IP address, an administrator can set a filter so that IP addresses from bad requesters are added to a bad IP address list and so that these IP addresses can be ignored by the system 10 in future. Users are identified from outside the system 10 using a certificate generated at the site using the system 10. Usually the site is that of a company which then assumes responsibility to the certificate to outside customers. The certificate authentication server is usually a third party application which is used to authenticate the certificate used by the incoming request.

Session Service

The system 10 defines a session as a request window from a source outside the system 10 that has a specific time window in which actions can be performed and service level requests handled. A session holds information regarding the requesting clients permissions within the system 10. This information consists of Access Control Lists (ACL) relating to devices (servers) and applications the requesting client has permission to use. A session also holds references to workflows used within a session time window. These workflows are temporary holding storage places for intermediate data generated by a transaction between a client session and a backend service within system 10. A session service starts a session by starting when a user logs into system 10 and issues a command. The expiration time defines a time window within which user actions are accepted. Actions outside this window are considered invalid. A valid time window is defined for a specific interval of time, which the a system administrator defines. The time window interval is reset and a new expiration count down clock is started for the user session window when the user sends another request within the existing user session time interval. A session is non-localized in the sense that any point within the system 10 can be used as an entry point for a session. The session information is distributed between the topology services so as to provide a global access point for session requests.

Workflow Service

The system 10 uses a workflow service which is a transaction-processing (TP) monitor that provides a temporary storage facility for intermediate transaction data. The workflow service is used to provide optimal bandwidth and resource usage between different TP components within the system 10. It acts as a fault-tolerant temporary storage area for data being processed over the web. The workflow service defines workflow object comprising of a data cache that holds intermediate data being processed for a transaction monitored by the system 10.

Time Service

The system 10 uses a time service to time stamp and synchronize messages and events within the system 10. The time service provides a basic utility library of API's to help in coordination of system events. Support for single, periodic, and custom time events are provided. The Time Service is responsible for synchronizing the various components using point-to-point messages and broadcast events within the system.

Specific Implementation

Figure 19:
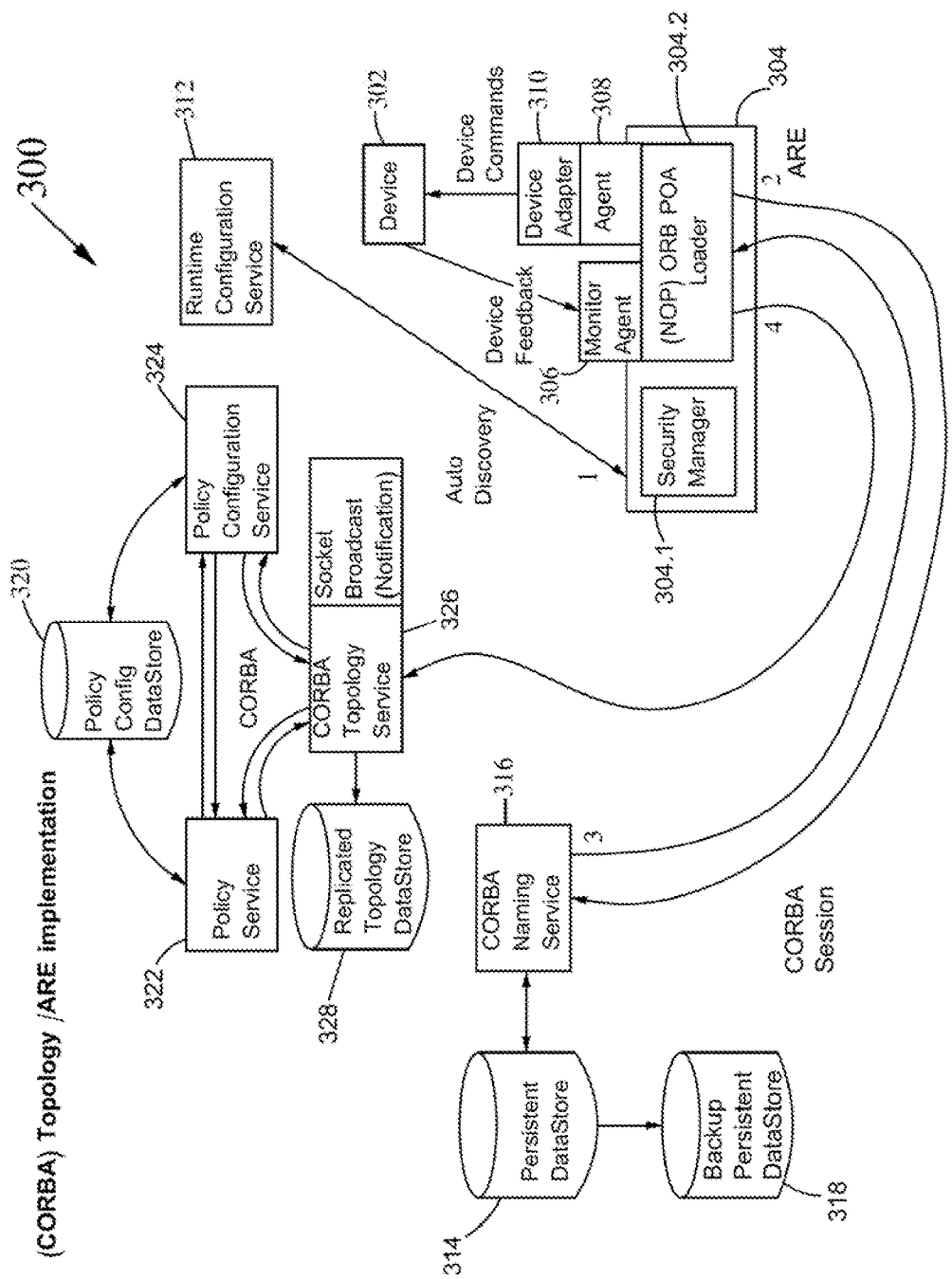
FIG. 19 shows an implementation of a system in accordance with one embodiment of the invention.

FIG. 19 shows an implementation 300 of a system 10 in accordance with the invention, using CORBA. The implementation 300 includes a managed device 302 which is managed or controlled by an ARE 304. The ARE 304 includes a security manager 304.1 and a class loader 304.2. A monitoring agent 306 monitors for feedback from device 302. A policy agent 308 issues commands and communicates with the device 302 via a device adapter 310. The ARE 304 obtains configuration information at runtime from a configuration service 312 during an auto discovery phase in which the ARE 304 is updated with system configuration information. A CORBA session is established between the ARE 304 and a CORBA naming service In particular the system 10 defines a session as a request window from a source outside the system 10 control domain that has a specific time window in which actions can be performed and service level requests handled.

The session holds information regarding the requesting clients permissions within the system 10. This information comprises Access Control Lists (ACL) relating to devices (Servers) and applications the requesting client has permission to use.

A session object is created to hold references to objects that are used within a session time window. These objects are temporary holding storage places for intermediate data generated by a transaction between the client session and some backend service within domains. An expiration timer is started when an agent activates and issues a command. Agent interactions are only accepted within this valid time window. A valid time window is defined for a specific interval of time, which a system administrator defines. The time window interval is reset and a new expiration count down clock is started for the user session window when the user sends another request within the existing user session time interval. A session is non-localized in the sense that any agent within the domain can be approached as an entry point for a session. The session information will be distributed between all the Topology Services running so as to provide a global access point for session requests. The naming service 314 saves information to a persistent data store 316 which is backed up into a back-up persistent data store 318.

The implementation 300 includes a policy configuration data storage 320 which is accessed by a policy service and a policy configuration service 324. Each of the policy service 322 and policy configuration service 324 communicate and exchange information with a topology service 326. The topology service 326 is able to broadcast sockets based broadcasts/alerts to the ARE 304. To alert the ARE 304 of changes in network policy. Topology information stored in the topology server 326 is replicated in a data store 328.

Figure 20:
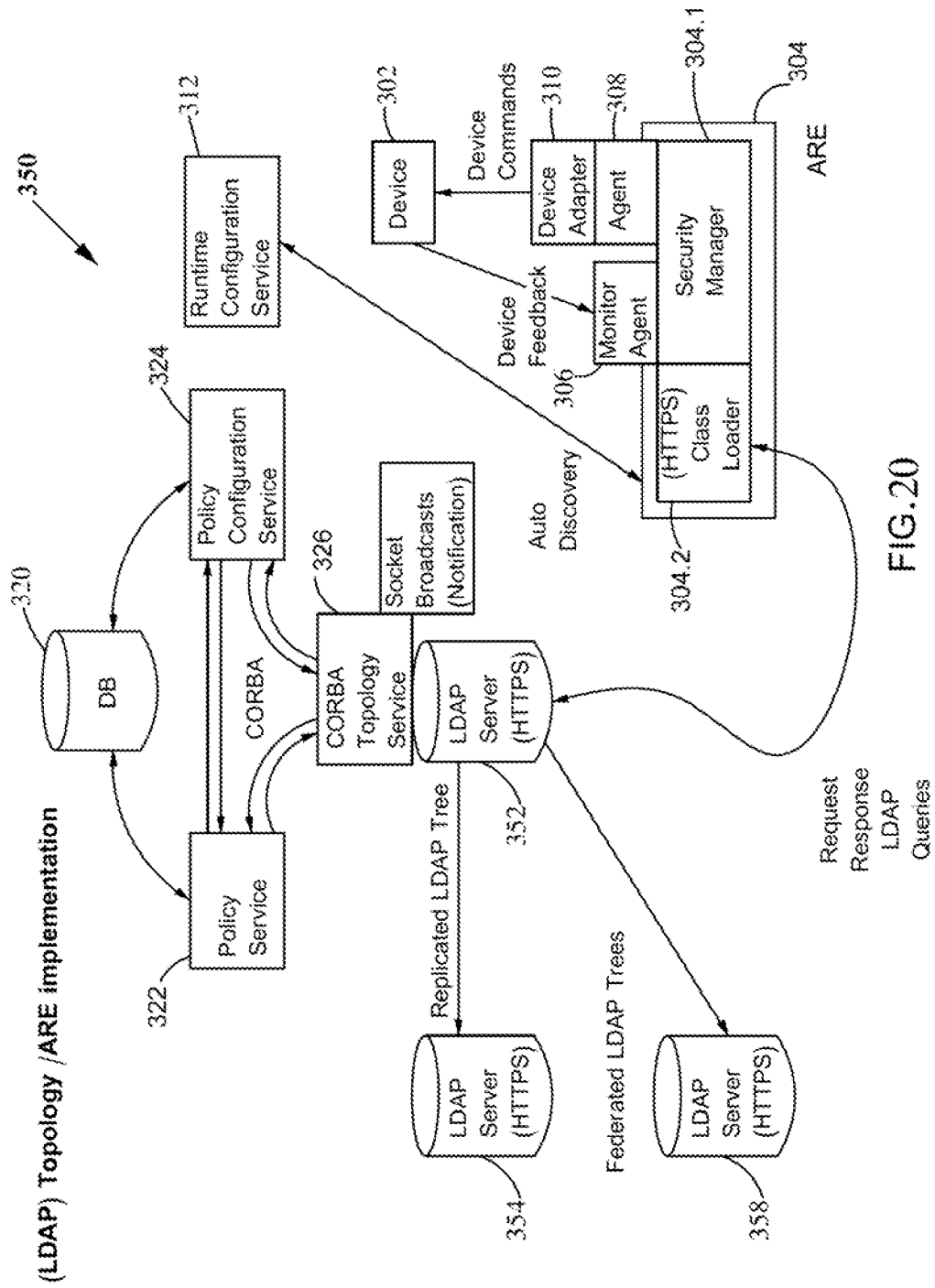
FIG. 20 shows an implementation of a system in accordance with another embodiment of the invention.

FIG. 20 shows another implementation 350 of a system 10 in accordance with the invention. The implementation 350 is similar to the implementation 300 and accordingly the same reference numerals have been used to describe the same or similar features. The main difference between implementation between 350 and implementations 300 is that implementation 350 utilizes an LDAP server 352 which is accessed by class loader 304.2. The LDAP server 352 is replicated in LDAP server 354 and in one or more federated LDAP servers 358.

In implementations 300 and 350 other services necessary for the operation of system 10, which services have already been described, have not been included for the sake of clarity. However, a reader skilled in the art will appreciate how these services relate to implementations 300 and 350.

Figure 21:
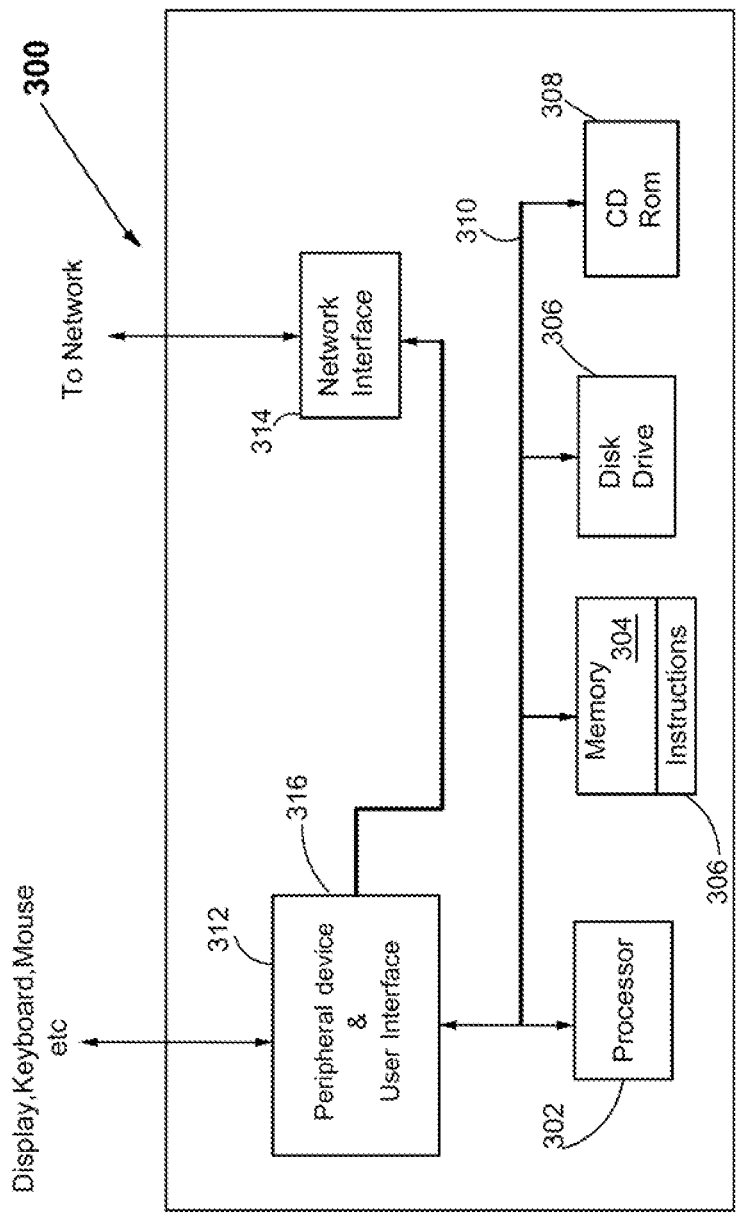
FIG. 21 shows a diagrammatic representation of exemplary hardware for performing aspects of the present invention.

In the above description reference was made to servers at various places. For example, each of the services was described as running on one or more servers. FIG. 21 shows various components making up a server 300 in accordance with one embodiment of the invention. Referring to FIG. 21 it will be seen that system hardware 300 includes a memory 304, which may represent one or more physical memory devices, which may include any type of random access memory (RAM) read only memory (ROM) (which may be programmable), flash memory, non-volatile mass storage device, or a combination of such memory devices. The memory 302 is connected via a system bus 310 to a processor 302. The memory 304 includes instructions 306 which when executed by the processor 302 cause the processor to perform the methodology of the invention or run one or more services as discussed above. Additionally, the system 300 includes a disk drive 306 and a CD ROM drive 308 each of which is coupled to a peripheral-device and user-interface 312 via bus 310. Processor 302, memory 304, disk drive 306 and CD ROM 308 are generally known in the art. Peripheral-device and user-interface 312 provide an interface between system bus 310 and various components connected to a peripheral bus 316 as well as to user interface components, such as display, mouse and other user interface devices. A network interface 314 is coupled to peripheral bus 316 and provides network connectivity to system 300.

For the purposes of this specification, a machine-readable medium includes any mechanism that provides (i.e. stores and/or transmits) information in a form readable by a machine (e.g. computer) for example, a machine-readable medium includes read-only memory (ROM); random access memory (RAM); magnetic disk storage media; optical storage media; flash memory devices; electrical, optical, acoustical or other form of propagated signals (e.g. carrier waves, infra red signals, digital signals, etc.); etc.

It will be apparent from this description the aspects of the present invention may be embodied, at least partly, in software. In other embodiments, hardware circuitry may be used in combination with software instructions to implement the present invention. Thus, the techniques are not limited to any specific combination of hardware circuitry and software.

Although the present invention has been described with reference to specific exemplary embodiments, it will be evident that various modification and changes can be made to these embodiments without departing from the broader spirit of the invention as set forth in the claims. Accordingly, the specification and drawings are to be regarded in an illustrative sense rather than in a restrictive sense.

Further, particular methods of the invention have been described in terms of computer software with reference to a series of flowcharts. The methods to be performed by a computer constitute computer programs made up of computer-executable instructions illustrated as blocks (acts). Describing the methods by reference to a flowchart enables one skilled in the art to develop such programs including such instructions to carry out the methods on suitably configured computers (the processing unit of the computer executing the instructions from computer-readable media). The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g. program, procedure, process, application, module, logic . . . ), as taking an action or causing a result. Such expressions are merely a shorthand way of saying that execution of the software by a computer causes the processor of the computer to perform an action or a produce a result. It will be appreciated that more or fewer processes may be incorporated into the methods as described above without departing from the scope of the invention, and that no particular order is implied by the arrangement of blocks shown and described herein.

Examples

Specific examples of system 10 components described above are now provided.

(a) In a JAVA embodiment, the messaging adapter 112 may be described by the following class definitions:

```
class SendQueue
    super actor      /* sending messages is an action */
    methods
        Send +<Rcp> [+<Ref>] +<Msg-type> +<Content> {...}
class ReceiveQueue
    super sensor     /* receiving messages is a sensing activity */
    methods
        rec_s ?<Sdr> ?<Msg-type> ?<Content> {...}
        rec_a ?<Sdr> ?<Msg-type> ?<Content> [+<Timeout>] {...}
```

These definitions provide two functions which allow an agent 110 to receive messages from other agents viz. rec_s and rec_a. rec_s is a function that waits synchronously until a message has been received. The arguments denote (from left to right) the sender of the message, message type, and actual message content. If the arguments are provided with values, only messages matching the parameter descriptions are returned. rec_a looks for messages asynchronously and fails if no matching messages have been received. rec_a has an optional time-out parameter allowing it to specify a time interval during which the message queue is monitored for matching messages. The default value for this time interval may be set to zero.

(b) Each message may be represented as a tuple:
Msg=(Id, Sender, Recipient, Reference, Type, Content), in which
Id=Unique message identifier;
Sender=mnemonic of Sender of message (IP address, IOR, etc.);
Recipient=mnemonic of Recipient of message (IP address, IOR, etc.)
Reference=reference to a message Id (this is an optional field and used if a hierarchical message layout is desired;
Type=the taxonomic identifier of this message and
Content=the actual message itself (c) The following schema declaration may be used to implement a PKB policy repository:

```
[   policy (     name:    PolicyName )
    relation (   name:    RelationName
                 domain:  PolicyName_1#...#
                          PolicyName_n )
    attribute(   name:    AttributeName
                 policyt:                  PolicyName
                 type:                     Type )
    default (    name:    AttributeName
                 value:                    DefaultValue )
    feature (    name:    FeatureName
                 policy:                   PolicyName
                 type:                     Type
    init:        Init)...
]
```

(d) The assertional, retrieval and active information services described above are defined below:

| PKB Assertional Services | |
|---|---|
| createKBObj(Id) | returns a unique identification of a newly created KB object. |
| createPolicyObj(Id, Policy) | creates an instance of a concept denoted by concept and binds it to the object identified by Id |
| createRelation(IdList, Relation) | defines an instance of a new relation denoted by Relation Rel among the concept instances denoted by the object identifiers in IdList. The ordering of the members of IdList determines their ordering in the relation. |
| setValue(Id, Attribute, newValue) | assigns the value denoted by newValue to the attribute of the concept instance denoted by Id. |
| deleteKBObj(Id) | delete an object; deleting an object that is bound to a concept instance deletes the concept instance and all instances of relations having this concept instance as a member. |
| DeletePolicy | Deleted the instance of a Policy denoted by IdList |
| deleteRelation(IdList, Relation) | Deletes the instance of a Relation denoted by IdList |
| removeValue(Id, Attribute) | removes the value for the attribute of the concept instance denoted by Id. |

| PBK retrieval Services | |
|---|---|
| returnPolicy(PolicyList, IdList) | Returns a list of all instances of Policy |
| returnPolicyBool(Id, Policy, bool) | Returns true if the policy denoted by Id is a member of the Policy Knowledge Base |
| returnRelMembers(relation, ListofId) | Returns a list of policy instances denoting all tuples that define the relation desired |
| returnMemberBool(IdList, Relation, IdList) | Returns true if the tuple denoted by IdList is a member of the Relation |
| deleteKBObj(Id) | delete an object; deleting an object that is bound to a concept instance deletes the concept instance and all instances of relations having this concept instance as a member. |

| PBK Information/versioning services | |
|---|---|
| versionPolicy(Policy, Source, Destination, Id) | Causes any modification of policy instances to be sent to the destination address specified - if requested |
| versionRelation(Relation, Source, Destination, Id) | Causes any modification of relation instances to be sent to the destination address specified - if requested |

(e) The control unit 118 may use a PoticyMethodActor Class such as the one shown below

```
class PolicyMethodActor
    attributes
        Name
        Type              /* atomic or continuous */
        Range             /* admissible input values */
    methods
        calibrate +<Name> {...}
        execute +<Name> +<Params> {...}    /* for Type = atomic */
        activate +<Name> +<Params> {...}   /* for Type = continuous */
        suspend +<Id> {...}                /* for Type = continuous */
        deactivate +<Id> {...}             /* for Type = continuous */
```

(f) In the example below, "class Layer" defines the fundamental activity cycle of the control unit 118:

```
1  class Layer
2  attributes
3        Higher, Lower      /* neighboring layers */
4        Policy             /* current beliefs, goals, intentions */
5        Sit, Sit-desc      /* situations and situation descriptions */
6        Ops                /* operational primitives available */
7        Actreq             /* activation requests from layer i-1 */
8        Commitment         /* commit messages received from layer i+1 */
9        [...]
10 methods
```

-continued

```
11          policyUpdate +<policy> {...}              /* policy update function */
12          sitRec +<Sit> +<policy> +<Sit-desc> {...} /* sit. recognition. */
13          g-act +<Sit> +<Goals> {...}               /* goal activation funct. */
14          policyCheck +<Sg> +<Ops> {...}            /*policy checking funct.*/
15          op-select +<Sg> +<Ops> {...}              /* planning function */
16          schedule +<Int> +<Ints> {...}             /* scheduling function */
17          execute +<Int> {...}                      /* scheduling function */
18       [...]
19       cycle
20          Policy = policyUpdate(Policy);
21          Sit = s-rec(Sit ∪ Actreq, Policy, Sit-desc)
22          Goals = g-act(Sit, Goals);
23          Sg = {(S, G) I S ∈ Sit ∧Gg ∈ Goals ∧ G = g-act(S,_)};
24          (Comp-sg,Nocomp-sg)=policyCheck(Sg, Ops);
25                foreach Sg' ∈ Nocomp-sg    /* shift control to higher layer */
26                    Higher←receive(request, activate(Sg'));
27          Int = op-select(Comp-sg, Ops);
28          Int = schedule(Int, Commitment);
29          Int = execute(Int);
```

(g) The Domain Server class defined below may be used to implement the domain adapter 115 described with reference to FIG. 7.

class DomainSensor
attributes
Name
Value
Range
methods
calibrate+<Name> { ... }
enable+<Name> { ... }
disable+<Name> { ... }
get-val+<Name> { ... }

(h) The perception buffer may be defined by a Perception Buffer Class defined below:

Class PerceptionBuffer
methods
init { ... }
clear { ... }
get-val+<DomainSensor.name> { ... }
get-all { ... }
refresh+<DomainSensor.name> { ... }
refresh-all { ... }

(i) Services are represented in Interface Description Language, i.e. ORB (IDL) as follows:

```
module policy
{
        struct ServiceOperationParameter
        {
                string classParameterName;
                string parameterType;
                long   parameterNumber;
                ::com::netfuel::common::structures::ManagedObject
                        serviceOperationParameterManagedObject;
        };
        typedefsequence<ServiceOperationParameter>
                        ServiceOperationParameterList;
        struct ServiceOperation
        {
            string className;
            string classOperationName;
            string operationType;
            long numberOfParameters;
            ::com::netfuel::common::structures::ManagedObject
                    serviceOperationManagedObject;
            ServiceOperationParameterList
                    serviceOperationServiceOperationParameterList;
        };
        typedef sequence<ServiceOperation> ServiceOperationList;
        struct ServiceType
        {
                long long parentServiceTypeId;
                ::com::netfuel::common::structures::ManagedObject
                        serviceTypeManagedObject;
        };
        typedef sequence<ServiceType> ServiceTypeList;
        struct Service
        {
                string className;
                ServiceType serviceServiceType;
                ::com::netfuel::common::structures::ManagedObject
                        serviceManagedObject;
                ServiceOperationList serviceServiceOperationList;
```

```
            long long parentServiceId;
        };
        typedef sequence<Service> ServiceList;
};
```

A policy can be represented in IDL as follows:

```
module policy
{
    struct PolicyOperationParameter
    {
        long parameterNumber;
        string parameterValue;
    };
    typedefsequence<PolicyOperationParameter>
        PolicyOperationParameterList;
    struct PolicyAction
    {
        long actionOrderNumber;
        ::com::netfuel::common::structures::ManagedObject
            policyActionManagedObject;
        ::com::netfuel::policy::structures::ServiceOperation
            policyActionServiceOperation;
        PolicyOperationParameterList
            policyActionOperationParameterList;
    };
    typedef sequence<PolicyAction> PolicyActionList;
    struct PolicyCondition
    {
        string evaluationOperator;
        string evaluationValue;
        long long evaluationPeriod;
        boolean conditionNegated;
        ::com::netfuel::common::structures::ManagedObject
            policyConditionManagedObject;
        ::com::netfuel::policy::structures::ServiceOperation
            policyConditionServiceOperation;
        PolicyOperationParameterList
            policyConditionOperationParameterList;
    };
    typedef sequence<PolicyCondition> PolicyConditionList;
    struct PolicyConditionGroup
    {
        long groupOrderNumber;
        ::com::netfuel::common::structures::ManagedObject
            policyConditionGroupManagedObject;
        PolicyConditionList
            policyConditionGroupPolicyConditionList;
    };
    typedef sequence<PolicyConditionGroup>
        PolicyConditionGroupList;
    struct PolicyTimePeriodCondition
    {
        ::com::netfuel::common::structures::DateTime beginDate;
        ::com::netfuel::common::structures::DateTime endDate;
        ::com::netfuel::common::structures::ManagedObject
            policyTimePeriodConditionManagedObject;
    );
    typedef sequence<PolicyTimePeriodCondition>
        PolicyTimePeriodConditionList;
    struct PolicyActionGroup
    {
        long actionGroupOrderNumber;
        ::com::netfuel::common::structures::ManagedObject
            policyActionGroupManagedObject;
        PolicyActionList policyActionGroupPolicyActionList;
    };
    typedef sequence<PolicyActionGroup> PolicyActionGroupList;
    struct PolicyRule
    {
        string enabled;
        long priority;
        boolean mandatoryEvaluation;
        string sequencedActionType;
        string conditionListType;
        ::com::netfuel::common::structures::ManagedObject
            policyRuleManagedObject;
        PolicyTimePeriodConditionList
            policyRulePolicyTimePeriodConditionList;
        PolicyConditionGroupList
            policyRulePolicyConditionGroupList;
        PolicyActionGroupList policyRulePolicyActionGroup;
    };
    typedef sequence<PolicyRule> PolicyRuleList;
    struct Policy
    {
        ::com::netfuel::common::structures::ManagedObject
            policyManagedObject;
        PolicyRuleList policyPolicyRuleList;
    };
    typedef sequence<Policy> PolicyList;
}; // end module policy
```

What is claimed is:

1. A computer-implemented method, comprising:
running at least one thread in a first runtime environment;
monitoring operational parameters relating to the each thread including a per-thread utilization for the each thread;
detecting if there is an abnormality in the monitored operational parameters; and
performing a corrective action to fix any detected abnormalities, wherein
performing the corrective action comprises first making a request for a corrective policy to correct a detected abnormality from an entity external to the first runtime environment if the corrective policy is not available to an agent operating within the first runtime environment, wherein
performing the corrective action is based on the corrective policy applied by the agent running within the first runtime environment, wherein
the entity external to the first runtime environment is a global modeler configured to listen to events from a system comprising a plurality of runtime environments including the first runtime environment, each of the runtime environments running multiple threads.

2. The computer-implemented method of claim 1, wherein the corrective action comprises a load balancing operation.

3. The computer-implemented method of claim 1, wherein detecting if an abnormality exists comprises comparing the monitored operational parameters to known thresholds.

4. The computer-implemented method of claim 1, further comprising, by the global modeler,
observing a behavior of the system; and
creating corrective policy based on the observed system behavior.

5. The computer-implemented method of claim 4, wherein creating the corrective policy comprises using Kohonen's Self Organizing maps.

6. The computer-implemented method of claim 1, wherein creating the corrective policy comprises using Dijkstra's Self Stabilization Algorithm.

7. A non-transitory computer-readable medium comprising a sequence of instructions which when executed by a system causes the system to perform a method, comprising:
running at least one thread in a first runtime environment;
monitoring operational parameters relating to the each thread including a per-thread utilization for the each thread;
detecting if an abnormality exists based on the monitored operational parameters; and
performing a corrective action to fix any detected abnormalities; wherein
performing the corrective action comprises first making a request for a corrective policy to correct a detected abnormality from an entity external to the first runtime environment if the corrective policy is not available to an agent operating within the first runtime environment, wherein
performing the corrective action is based on the corrective policy applied by the agent running within the first runtime environment, wherein
the entity external to the first runtime environment is a global modeler configured to listen to events from a system comprising a plurality of runtime environments including the first runtime environment, each of the runtime environments running multiple threads.

8. The computer-readable medium of claim 7, wherein the corrective action comprises a load balancing operation.

9. The computer-readable medium of claim 7, wherein detecting if an abnormality exists comprises comparing the monitored operational parameters to known thresholds.

10. The computer-readable medium of claim 7, further comprising, by the global modeler,
observing a behavior of the system; and
creating corrective policy to correct the observed system behavior.

11. The computer-readable medium of claim 10, wherein creating the corrective policy is based on Kohonen's Self Organizing maps.

12. The computer-readable medium of claim 10, wherein creating the corrective policy comprises using Dijkstra's Self Stabilization Algorithm.

13. A system, comprising:
a processor; and
a memory coupled to the processor, the memory storing instructions which when executed by the processor causes the system to perform a method comprising:
running at least one thread in a first runtime environment;
monitoring operational parameters relating to the or each thread including a per-thread utilization for each thread;
detecting there is an abnormality in the monitored operational parameters; and
performing a corrective action to fix any detected abnormalities; wherein
performing the corrective action comprises first making a request for a corrective policy to correct a detected abnormality from an entity external to the first runtime environment if the corrective policy is not available to an agent operating within the first runtime environment, wherein
performing the corrective action is based on the corrective policy applied by the agent running within the first runtime environment, wherein
the entity external to the first runtime environment is a global modeler configured to listen to events from a system comprising a plurality of runtime environments including the first runtime environment, each of the runtime environments running multiple threads.

14. The system of claim 13, wherein the corrective action comprises a load balancing operation.

15. The system of claim 13, wherein detecting if an abnormality exists comprises comparing the monitored operational parameters to known thresholds.

16. The system of claim 13, further comprising, by the global modeler,
observing a behavior of the system; and
creating corrective policy based on the observed system behavior.

17. The system of claim 16, wherein creating the corrective policy comprises using Kohonen's Self Organizing maps.

18. The system of claim 13, wherein creating the corrective policy comprises using Dijkstra's Self Stabilization Algorithm.

* * * * *

UNITED STATES PATENT AND TRADEMARK OFFICE
CERTIFICATE OF CORRECTION

PATENT NO. : 9,663,659 B1  
APPLICATION NO. : 13/648623  
DATED : May 30, 2017  
INVENTOR(S) : James D. Harlow Page 1 of 1

It is certified that error appears in the above-identified patent and that said Letters Patent is hereby corrected as shown below:

In the Specification

Please add the following paragraph before the heading "FIELD OF THE INVENTION":

This application is a continuation of U.S. Application No. 13/363,203; filed on January 31, 2012, which is a continuation of U.S. Application No. 12/789,450 filed on May 27, 2010, now U.S. Patent No. 8,131,851 issued on June 3, 2012, which is a continuation of U.S. Application No. 10/186,526 filed on June 28, 2002, now U.S. Patent No. 7,747,730 issued on June 29, 2010.

Signed and Sealed this  
Fifteenth Day of January, 2019

Andrei Iancu  
*Director of the United States Patent and Trademark Office*

(12) INTER PARTES REVIEW CERTIFICATE (2784th)

United States Patent
Harlow

(10) Number: US 9,663,659 K1
(45) Certificate Issued: Aug. 4, 2022

(54) MANAGING COMPUTER NETWORK RESOURCES

(71) Applicant: James D. Harlow

(72) Inventor: James D. Harlow

(73) Assignee: NETFUEL INC.

Trial Number:

IPR2019-00992 filed Apr. 18, 2019

Inter Partes Review Certificate for:

Patent No.: 9,663,659
Issued: May 30, 2017
Appl. No.: 13/648,623
Filed: Oct. 10, 2012

The results of IPR2019-00992 are reflected in this inter partes review certificate under 35 U.S.C. 318(b).

INTER PARTES REVIEW CERTIFICATE
U.S. Patent 9,663,659 K1
Trial No. IPR2019-00992
Certificate Issued Aug. 4, 2022

AS A RESULT OF THE INTER PARTES REVIEW PROCEEDING, IT HAS BEEN DETERMINED THAT:

Claims 1-3, 6-9, 13-15 and 18 are cancelled.

* * * * *